US011436639B2

(12) United States Patent
Tabara et al.

(10) Patent No.: US 11,436,639 B2
(45) Date of Patent: Sep. 6, 2022

(54) BEHAVIORAL ANALYSIS DEVICE, ADVERTISEMENT DISTRIBUTION DEVICE, BEHAVIORAL ANALYSIS METHOD, ADVERTISEMENT DISTRIBUTION METHOD, BEHAVIORAL ANALYSIS PROGRAM, AND ADVERTISEMENT DISTRIBUTION PROGRAM

(71) Applicant: Rakuten Group, Inc., Tokyo (JP)

(72) Inventors: Akihito Tabara, Tokyo (JP); Koji Kinoshita, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 16/867,211

(22) Filed: May 5, 2020

(65) Prior Publication Data
US 2020/0357023 A1 Nov. 12, 2020

(30) Foreign Application Priority Data
May 9, 2019 (JP) .............................. JP2019-088990

(51) Int. Cl.
*G06Q 30/02* (2012.01)
(52) U.S. Cl.
CPC ..... *G06Q 30/0261* (2013.01); *G06Q 30/0255* (2013.01); *G06Q 30/0259* (2013.01)
(58) Field of Classification Search
CPC ........... G06Q 30/0261; G06Q 30/0255; G06Q 30/0259
See application file for complete search history.

(56) References Cited

U.S. PATENT DOCUMENTS

2008/0249832 A1* 10/2008 Richardson ............ G06Q 30/02
705/14.54
2012/0259854 A1* 10/2012 Hsiao ................. G06Q 30/0251
707/E17.046
(Continued)

FOREIGN PATENT DOCUMENTS

JP          6283260 B2      2/2018

OTHER PUBLICATIONS

"Tie Together Offline & Online Engagement with 'Store Visits' in Google Analytics" (Anwar, Aniqa; published at https://www.seerinteractive.com/blog/offline-online-store-visits-in-google-analytics/ on Mar. 15, 2019) (Year: 2019).*
(Continued)

*Primary Examiner* — James M Detweiler
(74) *Attorney, Agent, or Firm* — Sughrue Mion, PLLC

(57) ABSTRACT

A behavioral analysis device acquires designated location information regarding a location of a place designated in advance. The behavioral analysis device acquires a history of terminal location information regarding a location of terminal, user identification information associated with the terminal location information, and a history of operation information indicating at least one operation behavior taken through at least one terminal operation of a user having the identification information. The behavioral analysis device identifies identification information associated with the terminal location information being substantially the same as the designated location information, and outputs tendency information indicating a tendency of at least one operation behavior taken by a user having the identified identification information and taken before a time when a terminal is located at a location indicated by the terminal location information substantially the same as the designated location (Continued)

information, for distribution of information regarding the place designated in advance.

10 Claims, 15 Drawing Sheets

(56) References Cited

U.S. PATENT DOCUMENTS

| | | | | |
|---|---|---|---|---|
| 2014/0214535 A1* | 7/2014 | Kee | ............... | G06Q 30/0275 705/14.53 |
| 2015/0006712 A1* | 1/2015 | Khann | ............... | H04L 67/52 709/224 |
| 2015/0066634 A1* | 3/2015 | Armon-Kest | ...... | G06Q 30/0275 705/14.54 |
| 2016/0048869 A1* | 2/2016 | Shim | ............... | G06Q 30/0246 705/14.45 |

OTHER PUBLICATIONS

"Everything you need to know about AdWords' store visit conversions" (Kim, Larry; published at https://www.searchenginewatch.com/2016/06/20/everything-you-need-to-know-about-adwords-store-visit-conversions/ on Jun. 20, 2016) (Year: 2016).*

* cited by examiner

FIG.12A
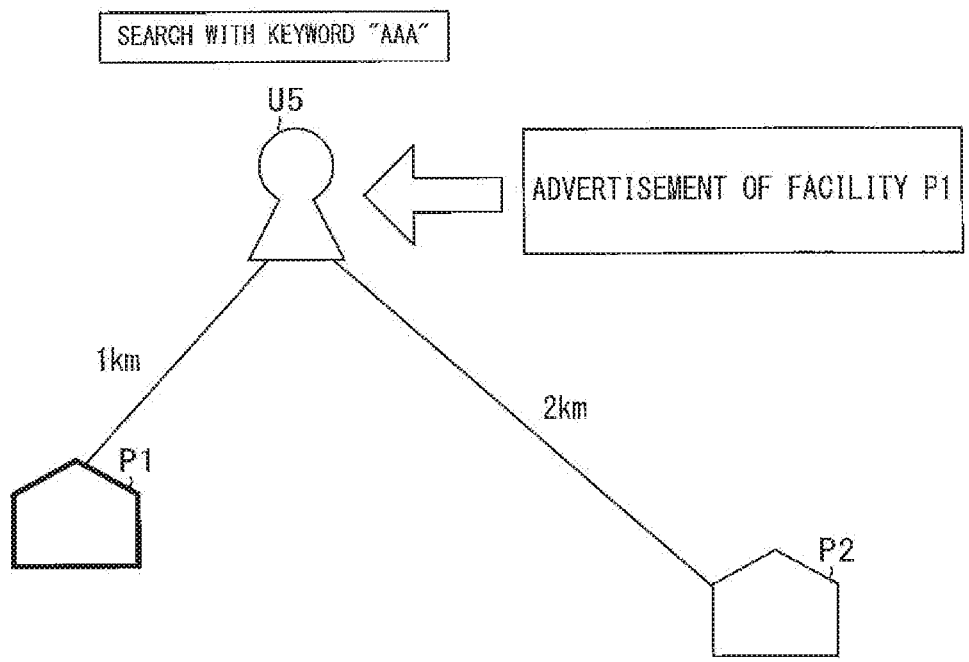
FIG.12B
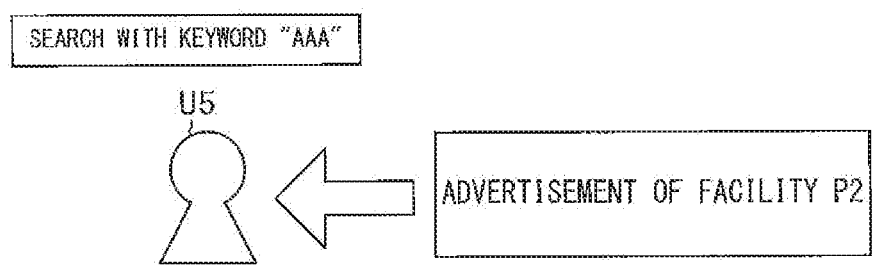
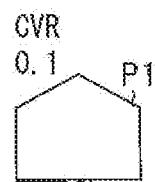
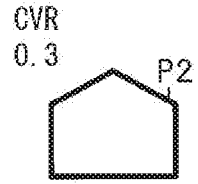

FIG.14

S1: COLLECT INFORMATION ON SIGHTSEEING IN PLURALITY OF PREFECTURES INCLUDING HOKKAIDO

S2: COMPARE INFORMATION ON SIGHTSEEING ← DISTRIBUTE — ADVERTISEMENT OF HOKKAIDO ABC ASSOCIATION

S3: SEARCH FOR HOTEL IN HOKKAIDO

S4: BOOK HOTEL IN HOKKAIDO ← DISTRIBUTE — ADVERTISEMENT OF FACILITY IN HOKKAIDO

S5: GO TO HOKKAIDO

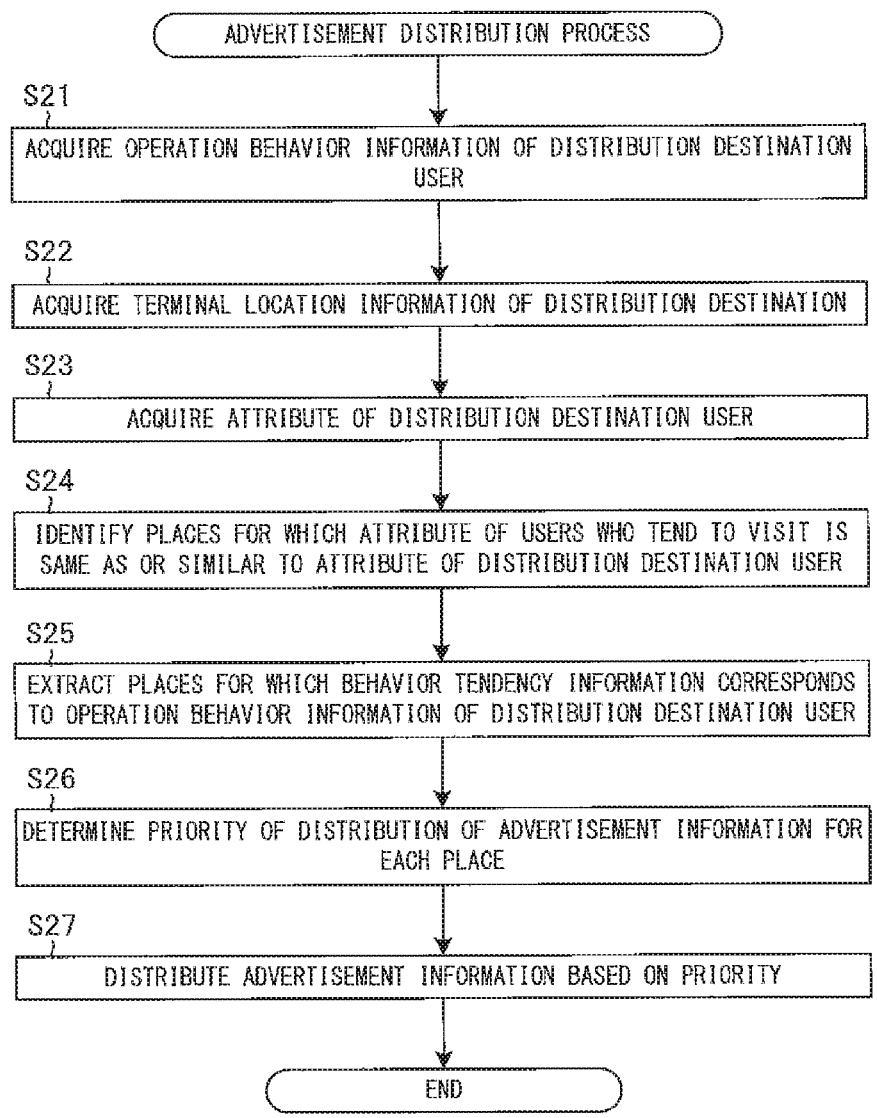

BEHAVIORAL ANALYSIS DEVICE, ADVERTISEMENT DISTRIBUTION DEVICE, BEHAVIORAL ANALYSIS METHOD, ADVERTISEMENT DISTRIBUTION METHOD, BEHAVIORAL ANALYSIS PROGRAM, AND ADVERTISEMENT DISTRIBUTION PROGRAM

CROSS-REFERENCE TO RELATED PATENT APPLICATION

This application claims priority from Japanese Patent Application No. 2019-88990 filed May 9, 2019, the entire disclosure of which, including the specification, the scope of claims, drawings, and abstract, is incorporated herein by reference in its entirety.

TECHNICAL FIELD

The present invention relates to a technical field of user behavioral targeting advertising.

RELATED ART

Background

Conventionally, there is known a technology for analyzing behaviors of a user, such as information search and browsing of websites, to estimate a user's interest, and distributing advertisement information suitable for the interest. For example, JP 6283260 B2 discloses an information providing system that distributes an advertisement content by using a schedule registered by a user and logs of actions of the user. Specifically, this information providing system identifies a user event from the schedule, and determines a stage in the event from a log including a keyword corresponding to the event. The information providing system distributes a recommended content corresponding to the determined stage.

SUMMARY

Meanwhile, in a case of promoting visits to places related to advertisers, it is conceivable to distribute advertisement information related to the place, for example, to a user whose behavior log or schedule includes a behavior or a keyword related to the place. However, even if the user is consciously or unconsciously interested in the place, the user may not take a behavior explicitly related to the place. Further, the user may not register some schedules. Therefore, there is a possibility that it is not possible to present an appropriate place for a user's behavior since there is a lack of information on the user's behavior.

The present invention has been made in view of the above points, and an example of an object of the present invention is to provide a behavioral analysis device, an advertisement distribution device, a behavioral analysis method, an advertisement distribution method, a behavioral analysis program, and an advertisement distribution program capable of increasing the number of users who visit a place targeted by an advertisement on the basis of analysis of user behaviors.

An aspect of the present invention is a behavioral analysis device comprising: at least one memory configured to store computer program code; and at least one processor configured to read the computer program code from the at least one memory and operate as instructed by the computer program code, the computer program code comprising: a designated location information acquisition code configured to cause the at least one processor to acquire designated location information regarding a location of a place that has been designated in advance; a behavior history acquisition code configured to cause the at least one processor to acquire from a storage, for each of a plurality of users, a history of terminal location information regarding a location of a terminal of a respective user, identification information of the respective user associated with the terminal location information, and a history of operation information indicating an operation behavior taken through at least one terminal operation by the respective user having the identification information; and an output code configured to cause the at least one processor to identify the identification information associated with the terminal location information being substantially the same as the designated location information, and output tendency information indicating a tendency of at least one operation behavior taken by at least one user having the identified identification information and taken before a time when a terminal is locate at a location indicated by the terminal location information being substantially the same as the designated location information, for distribution of information regarding the designated place.

Another aspect of the present invention is an advertisement distribution device comprising: at least one memory configured to store computer program code; and at least one processor configured to read the computer program code from the at least one memory and operate as instructed by the computer program code, the computer program code comprising: a second behavior information acquisition code configured to cause the at least one processor to acquire second operation information indicating at least one operation behavior taken through at least one terminal operation by a second user on a second terminal; a tendency information acquisition code configured to cause the at least one processor to acquire the tendency information from an advertisement information storage that associates and stores the tendency information outputted by the behavioral analysis device according to claim 1 and advertisement information regarding the place that has been designated in advance; and a distribution code configured to cause the at least one processor to distribute, in response to determination that the acquired second operation information corresponds to the acquired tendency information, the advertisement information associated with the acquired tendency information to the second terminal.

Yet another aspect of the present invention is a behavioral analysis method performed by at least one computer, the method comprising: acquiring designated location information regarding a location of a place that has been designated in advance; acquiring from a storage, for each of a plurality of users, a history of terminal location information regarding a location of a terminal of a respective user, identification information of the respective user associated with the terminal location information, and a history of operation information indicating an operation behavior taken through at least one terminal operation by the respective user having the identification information; and identifying the identification information associated with the terminal location information being substantially the same as the designated location information, and outputting tendency information indicating a tendency of at least one operation behavior taken by at least one user having the identified identification information and taken before a time when a terminal is locate at a location indicated by the terminal location information being substantially the same as the designated location information, for distribution of information regarding the designated place.

Yet another aspect of the present invention is an advertisement distribution method performed by at least one computer, the method comprising: acquiring second operation information indicating at least one operation behavior taken through at least one terminal operation by a second user on a second terminal; acquiring the tendency information from an advertisement information storage that associates and stores the tendency information outputted by the behavioral analysis device according to claim 1 and advertisement information regarding the place that has been designated in advance; and distributing, in response to determination that the acquired second operation information corresponds to the acquired tendency information, the advertisement information associated with the acquired tendency information to the second terminal.

Yet another aspect of the present invention is a non-transitory computer readable medium storing thereon a behavioral analysis program, the behavioral analysis program, when executed by at least one processor, causing the at least one processor to: acquiring designated location information regarding a location of a place that has been designated in advance; acquiring from a storage, for each of a plurality of users, a history of terminal location information regarding a location of a terminal of a respective user, identification information of the respective user associated with the terminal location information, and a history of operation information indicating an operation behavior taken through at least one terminal operation by the respective user having the identification information; and identifying the identification information associated with the terminal location information being substantially the same as the designated location information, and outputting tendency information indicating a tendency of at least one operation behavior taken by at least one user having the identified identification information and taken before a time when a terminal is locate at a location indicated by the terminal location information being substantially the same as the designated location information, for distribution of information regarding the designated place.

Yet another aspect of the present invention is a non-transitory computer readable medium storing thereon an advertisement distribution program, the advertisement distribution program, when executed by at least one processor, causing the at least one processor to: acquiring second operation information indicating at least one operation behavior taken through at least one terminal operation by a second user on a second terminal; acquiring the tendency information from an advertisement information storage that associates and stores the tendency information outputted by the behavioral analysis device according to claim 1 and advertisement information regarding the place that has been designated in advance; and distributing, in response to determination that the acquired second operation information corresponds to the acquired tendency information, the advertisement information associated with the acquired tendency information to the second terminal.

BRIEF DESCRIPTION OF DRAWINGS

FIG. 12A is a view showing an example of determining a place for which advertisement information is distributed on the basis of distances;

FIG. 12B is a view showing an example of determining a place for which advertisement information is distributed on the basis of conversion rates;

FIG. 14 is a view showing an example of a series of operation behaviors that a user tends to take and a timing of distribution of advertisement information; and FIG. 15 is a flowchart showing an example of an advertisement distribution process by the system controller of the advertisement distribution server.

DETAILED DESCRIPTION

Hereinafter, embodiments of the present invention will be described in detail with reference to the drawings.

1. First Embodiment

The present embodiment is an embodiment in which the present invention is applied to a behavioral analysis system that analyzes users' behaviors for distributing advertisement for encouraging users to go to a place related to an advertiser, and provides an analysis result. The place related to an advertiser is called an advertisement target place.

For example, when a company, an organization, a store, or the like is to advertise on the Internet as an advertiser in order to increase the number of users visiting a place related to them, a behavioral analysis system is requested to analyze behaviors of users visiting the place. For example, if a store proprietor is the advertiser, the advertisement target place may be a store. If a tourism association of a certain prefecture is the advertiser, the advertisement target place may be that prefecture. If an organizer of an event is the advertiser, the advertisement target place may be a place where the event is held.

As information indicating a user behavior to be analyzed, there are location information indicating a location of a portable terminal used by the user, and operation information indicating an operation behavior taken by the user through a terminal operation. A history of the location information indicates a result of user's movement behaviors. The operation behavior may be, for example, a behavior performed by accessing a website through an operation on a web browser, or a behavior performed through an operation on an application program other than the web browser. Examples of the operation behavior include searching for web pages, browsing web pages, purchasing items for sales through online shopping, booking accommodation facilities, tickets, services, and the like on the Internet, posting information, and the like.

[1-1. Configuration of Behavioral Analysis System]

Figure 1:
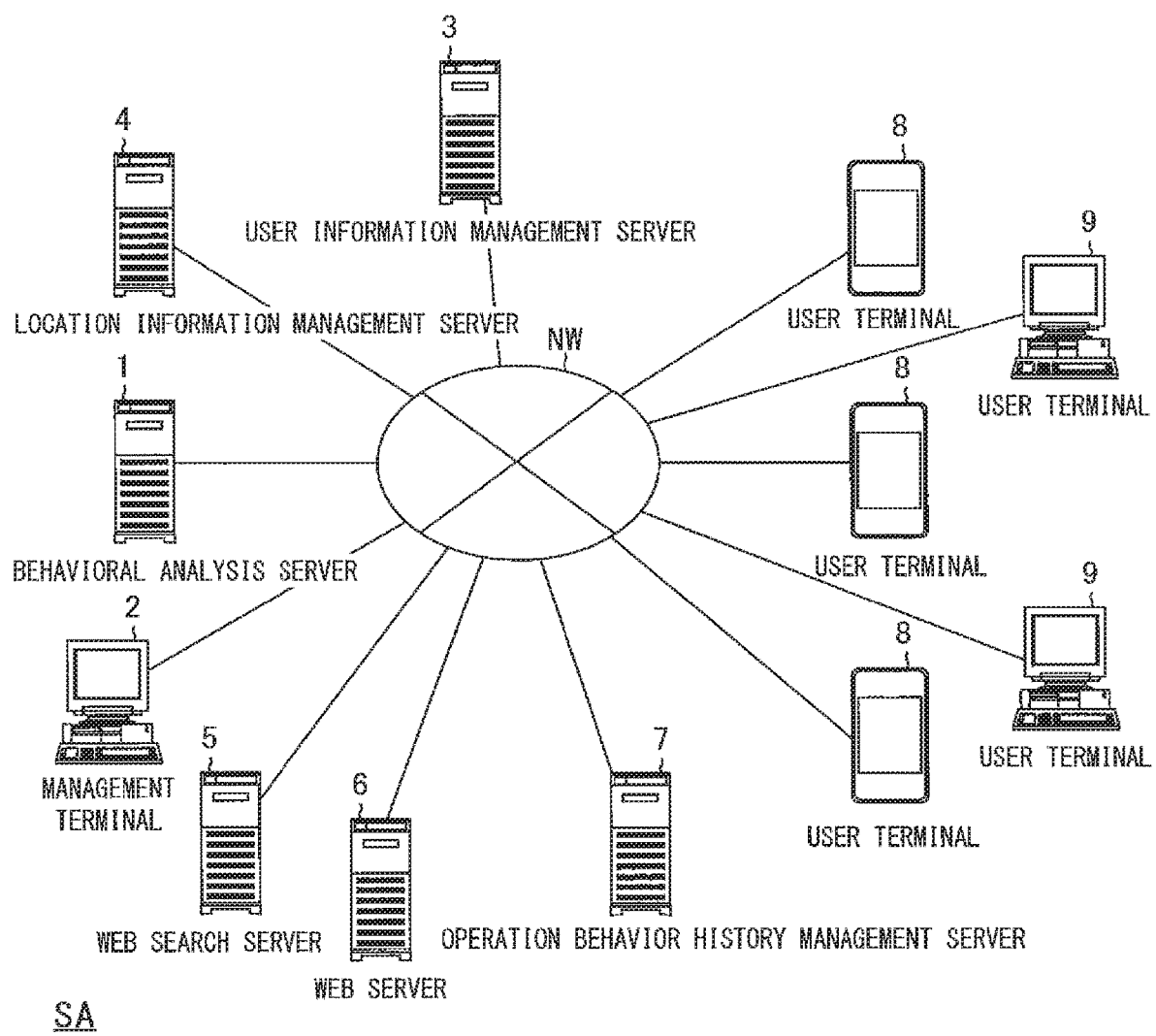
FIG. 1 is a diagram showing an example of a schematic configuration of a behavioral analysis system SA according to one embodiment.
Figure 2:
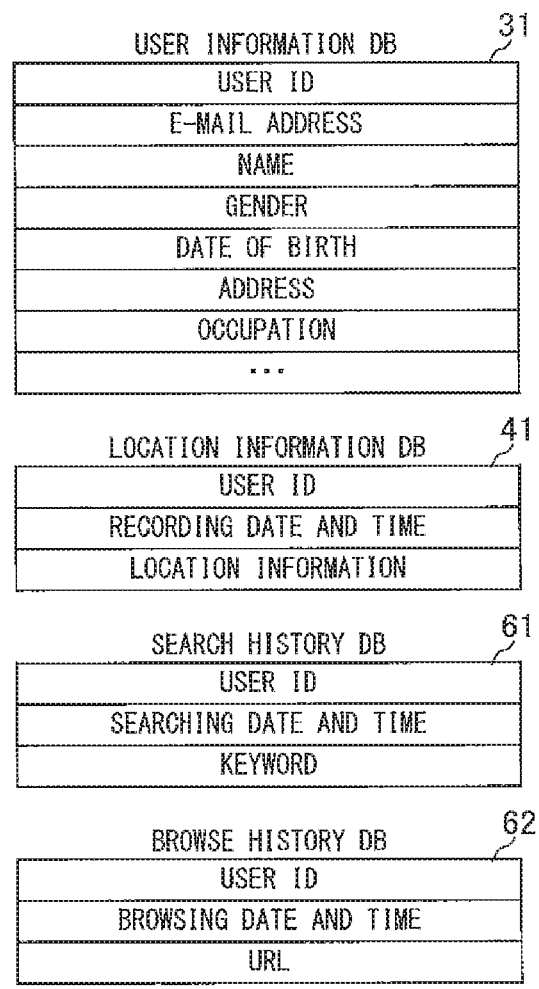
FIG. 2 is a view showing an example of information stored in databases.

First, an outline of a configuration and functions of a behavioral analysis system SA according to the present embodiment will be described with reference to FIGS. 1 and 2. FIG. 1 is a diagram showing an example of a schematic configuration of the behavioral analysis system SA according to the present embodiment. FIG. 2 is a view showing an example of information stored in databases.

As shown in FIG. 1, the behavioral analysis system SA includes a behavioral analysis server 1, a management terminal 2, a user information management server 3, a location information management server 4, a web search server 5, a web server 6, an operation behavior history management server 7, a plurality of user terminals 8, and a plurality of user terminals 9. The behavioral analysis server 1, the management terminal 2, the user information management server 3, the location information management server 4, the web search server 5, the web server 6, the operation behavior history management server 7, the user terminals 8, and the user terminals 9 are connected to each other via a network NW. The network NW is constructed by, for example, the Internet, a dedicated communication line (for example, a community antenna television (CATV) line), a mobile communication network (including base stations and the like), a gateway, and the like.

The behavioral analysis server 1 analyzes behaviors of users visiting the advertisement target place on the basis of information managed by the user information management server 3, the location information management server 4, and the operation behavior history management server 7.

The management terminal 2 is a terminal device used by an administrator of the behavioral analysis server 1. For example, the management terminal 2 transmits information inputted by the administrator, to the behavioral analysis server 1. Further, the management terminal 2 receives and displays information and the like indicating an analysis result by the behavioral analysis server 1.

The user information management server 3 manages, for example, user information on users registered in a predetermined Internet integrated service. A storage provided in the user information management server 3 stores a user information DB 31. "DB" is an abbreviation for database. The user information DB 31 stores user information indicating user attributes for each user. For example, as user information, a user ID, an e-mail address, a name, gender, a date of birth, an address, an occupation, and the like are stored in association with each other. The user ID is information for identifying a user in the predetermined Internet integrated service. By using this user ID, the user can receive various services within the predetermined Internet integrated service. Examples of the provided services include web search, online shopping, booking of tickets and accommodation facilities, provision of information such as videos, and the like. However, the provided services are not particularly limited.

The location information management server 4 manages a history of location information indicating a geographical location of each user terminal 8. A storage provided in the location information management server 4 stores a location information DB 41. The location information DB 41 stores a user ID, a recording date and time, and location information in association with each other. The user ID indicates a user who uses a user terminal 8. The recording date and time is a date and time when the location information has been recorded by the user terminal 8. The location information may be, for example, longitude and latitude.

The web search server 5 searches for web pages in response to a request from the user terminal 8 or 9. In the present embodiment, a web page search request from the user terminal 8 and the user terminal 9 with use of an application program or an add-on described later is transmitted to the web search server 5 via the operation behavior history management server 7. The web search server 5 receives a search request including a search condition such as a keyword inputted by the user on the user terminal 8 or 9. The web search server 5 searches for web pages that matches the search condition, and transmits search results to the operation behavior history management server 7.

The web server 6 is a web server that manages a website that provides users with predetermined services in the predetermined Internet integrated service. The web server 6 transmits a web page in response to a request from the user terminal 8 or 9. The web server 6 may be installed for each service.

The operation behavior history management server 7 manages a history of operation behavior information taken by each user through a terminal operation on the user terminal 8 or 9. For example, the operation behavior history management server 7 may manage a search history and a browse history of a web page. Therefore, a storage provided in the operation behavior history management server 7 stores a search history DB 61 and a browse history DB 62. The search history DB 61 stores search histories of web pages. For example, the search history DB 61 stores a user ID, a searching date and time, and search conditions such as a keyword in association with each other as a search log. The user ID indicates a user who has requested the search. The searching date and time indicates a date and time when the search has been executed as the operation behavior date and time. The browse history DB 62 stores browse histories of web pages. For example, the browse history DB 62 stores a user ID, a browsing date and time, a uniform resource locator (URL), and the like in association with each other as a browsing log. The user ID indicates a user who has browsed the web page. The browsing date and time indicates a date and time when the web page has been browsed as the operation behavior date and time. The URL indicates a browsed web page. When receiving a search request from the user terminal 8 or 9, the operation behavior history management server 7 stores the search log in the search history DB 61. In addition, when receiving search results from the web search server 5, the operation behavior history management server 7 transmits a web page indicating the search results to the user terminal 8 or 9 that has transmitted the search request. When the user terminal 8 or 9 displays a web page in response to the user selecting any web page from the search result web page, the operation behavior history management server 7 stores a browsing log for this web page in the browse history DB 62. The operation behavior history management server 7 may manage another history of the operation behavior information in addition to or instead of the search history and the browse history. For example, the operation behavior history management server 7 may manage a history of the operation behavior information generated when a user uses a site or the like within the predetermined Internet integrated service by the user terminal 8 or 9 accessing the web server 6. Examples of such a history include a browse history of web pages in a site, a purchase history of an item for sale, a service booking history, and a posting history of evaluations, comments, other sentences, and the like by the user.

Each user terminal 8 is a portable terminal device used by a user who uses the predetermined Internet integrated service. Examples of the user terminal 8 include a mobile information terminal such as a smartphone and a tablet computer, a mobile phone, personal digital assistant (PDA), and the like. Each user terminal 8 acquires location information of the user terminal 8. For example, location information may be calculated using a satellite navigation such as a global positioning system (GPS). For example, the user terminal 8 is installed with an application program for granting benefits such as points and coupons to a user when the user goes to a place related to the advertisement target place, such as a store. By executing this application program in the background, the user terminal 8 may periodically acquire the location information. The user terminal 8 transmits the acquired location information to the location information management server 4 together with the user ID and the recording date and time. The location information management server 4 stores the received information in the location information DB 41. Further, each user terminal 8 may be installed with an application program for searching for and browsing a web page. When the user searches for and browses a web page by using the application program, the operation behavior history management server 7 records the search history and the browse history.

Each user terminal 9 is a stationary personal computer used by a user who uses the predetermined Internet integrated service. Each user may have both the user terminals 8 and 9, or may have the user terminal 8 alone. Each user terminal 9 may be installed with a web browser and an add-on for a web page search. When the user searches for and browses a web page by using this add-on, the operation behavior history management server 7 records the search history and the browse history.

[1-2. Configuration of Behavioral Analysis Server]

Figure 3:
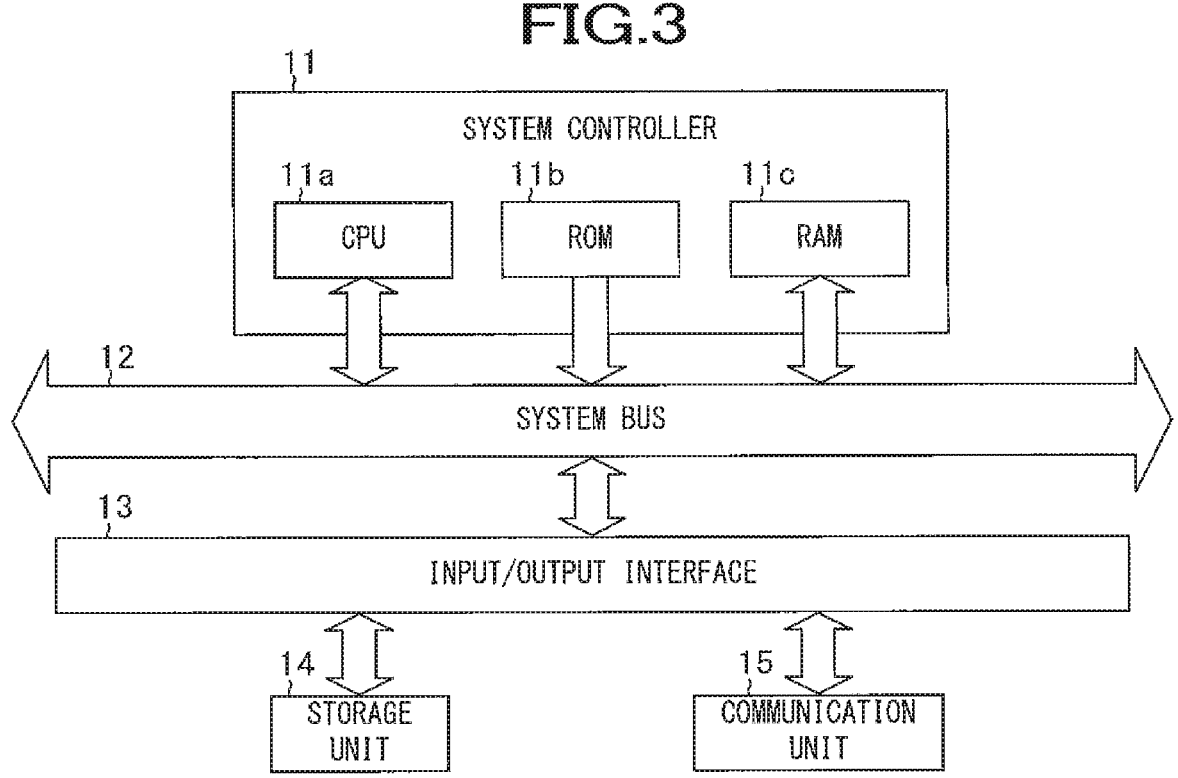
FIG. 3 is a block diagram showing an example of a schematic configuration of a behavioral analysis server according to one embodiment.

Next, a configuration of the behavioral analysis server 1 will be described with reference to FIG. 3. FIG. 3 is a block diagram showing an example of a schematic configuration of the behavioral analysis server 1 according to the present embodiment. As shown in FIG. 3, the behavioral analysis server 1 includes a system controller 11, a system bus 12, an input/output interface 13, a storage unit 14, and a communication unit 15. The system controller 11 and the input/output interface 13 are connected via the system bus 12.

The system controller 11 includes a central processing unit (CPU) 11a, a read only memory (ROM) 11b, a random access memory (RAM) 11c, and the like.

The input/output interface 13 performs interface processing between the system controller 11, and the storage unit 14 and the communication unit 15.

The storage unit 14 includes, for example, a hard disk drive and the like. The storage unit 14 stores user information acquired from the user information management server 3, location information acquired from the location information management server 4, search histories and browse histories acquired from the web search server 5. Further, the storage unit 14 stores various programs such as an operating system, a database management system (DBMS), and a behavioral analysis program. The behavioral analysis program is a program that causes the system controller 11 to execute a process for analyzing user behaviors. The behavioral analysis program, for example, may be acquired from another device via the network NW, or may be recorded on a recording medium such as a magnetic tape, an optical disk, or a memory card, and read through a drive device.

The communication unit 15 connects to the management terminal 2, the user information management server 3, the location information management server 4, the web search server 5, the web server 6, the operation behavior history management server 7, the user terminals 8, and the user terminals 9 via the network NW, and controls a communication state between with these devices.

[1-3. Outline of Functions of System Controller]

Figure 4:
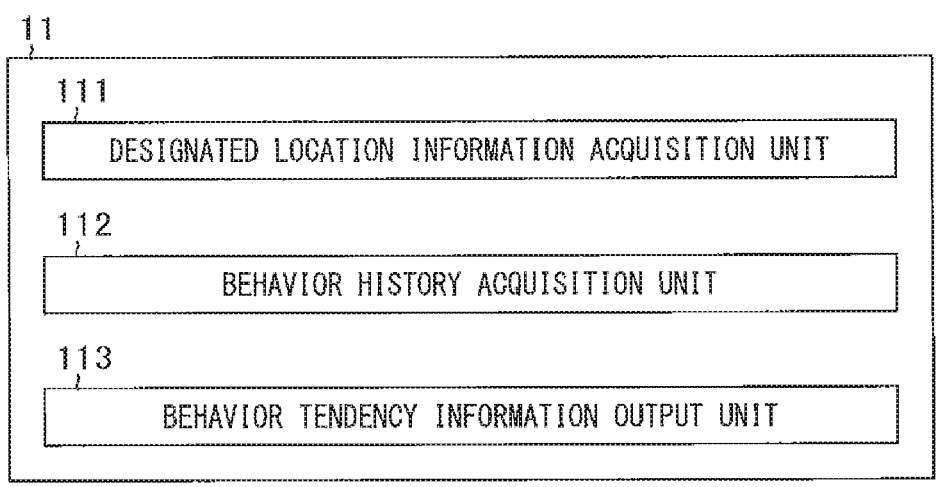
FIG. 4 is a diagram showing an example of functional blocks of a system controller of the behavioral analysis server 1 according to one embodiment.

Next, an outline of functions of the system controller 11 of the behavioral analysis server 1 will be described with reference to FIGS. 4 to 7. FIG. 4 is a diagram showing an example of functional blocks of the system controller 11 of the behavioral analysis server 1 according to the present embodiment. As shown in FIG. 4, the system controller 11 functions as a designated location information acquisition unit 111, a behavior history acquisition unit 112, a behavior tendency information output unit 113, and the like, by the CPU 11a reading and executing various program codes included in the behavioral analysis program. With the designated location information acquisition unit 111, the behavior history acquisition unit 112, and the behavior tendency information output unit 113, a tendency of operation behaviors of users visiting the advertisement target place are analyzed.

The designated location information acquisition unit 111 acquires designated location information regarding a location of a place designated in advance as the advertisement target place by an advertiser or the like. The designated location information may be, for example, longitude and latitude of the advertisement target place. If the advertisement target place is a section or a region having a certain size, the designated location information may be information indicating coordinates of a boundary of the section or region. The designated location information may be inputted to the management terminal 2, and transmitted from the management terminal 2 to the behavioral analysis server 1, for example. Alternatively, the designated location information may be stored in the storage unit 14 in advance. For example, there may be a plurality of advertisement target places, such as if the advertiser runs a plurality of stores. In this case, the designated location information acquisition unit 111 may acquire designated location information for each of the plurality of places.

The behavior history acquisition unit 112 acquires, for the plurality of user terminals 8, a history of terminal location information regarding a location of the user terminal 8, a user ID associated with the terminal location information, and a history of operation information indicating an operation behavior taken through the terminal operation of the user having the user ID. For example, the behavior history acquisition unit 112 acquires, as the history of the terminal location information, the terminal location information and the recording date and time from the location information DB 41, and acquires, as the user ID, a user ID associated with the terminal location information from the location information DB 41. When the history of the terminal location information and the history of the operation information are stored in association with each other in advance for each user, the behavior history acquisition unit 112 does not have to acquire the user ID while acquiring these histories.

A beacon may be installed in or near the advertisement target place. When the user terminal 8 approaches the beacon, the user terminal 8 may receive identification information of the beacon from the beacon and transmit the identification information to the behavioral analysis server 1. The behavior history acquisition unit 112 may acquire the identification information of the beacon as the terminal location information indicating that the user terminal 8 is located at the advertisement target place.

Further, as the history of the operation information, the behavior history acquisition unit 112 may acquire a search history from the search history DB 61 or may acquire a browse history from the browse history DB 62. Further, based on an operation on the management terminal 2, the terminal location information and a log may be transmitted to the behavioral analysis server 1 from the location information DB 41, the search history DB 61, or the browse history DB 62, and the log may be stored in the storage unit 14 of the behavioral analysis server 1 in advance. In this case, the behavior history acquisition unit 112 may simply acquire the log from the storage unit 14.

The behavior tendency information output unit 113 identifies a user ID associated with terminal location information being substantially the same as the designated location information acquired by the designated location information acquisition unit 111, in the history of the terminal location information acquired by the behavior history acquisition unit 112. That is, the behavior tendency information output unit 113 identifies a user who has been to the advertisement target place among users using the predetermined Internet integrated service. The terminal location information and the designated location information being substantially the same may indicate that there is no important difference in distance between a location of a terminal 8 and a location of an advertisement target place, or may indicate that a user is in the advertisement target place. The fact that the terminal location information and the designated location information are substantially the same includes a case where the designated location information is completely the same as the terminal location information. Further, the fact that the terminal location information and the designated location information are substantially the same may include a case where a location indicated by the terminal location information is within an area such as a section or a region indicated by the designated location information. Furthermore, the fact that the terminal location information and the designated location information being substantially the same may include a case where a distance from a location indicated by the designated location information to a location indicated by the terminal location information is less than a predetermined distance. In this case, the predetermined distance may be determined in advance based on whether or not it is possible to identify that the user has been to the advertisement target place.

The behavior tendency information output unit 113 outputs, for distribution of information regarding the advertisement target place, behavior tendency information indicating a tendency of an operation behavior taken by at least one user having the user ID identified as described above and taken before the time when the user terminal 8 of the user is located at the location indicated by the terminal location information being substantially the same as the designated location information. That is, the behavior tendency information output unit 113 identifies and outputs the tendency of the operation behavior taken by the user who has been to the advertisement target place before going to the place. A user who goes to a certain place has a probability of consciously or unconsciously performing a specific operation behavior related to the place before going to the place. Therefore, it is highly probable that the number of users who go to the advertisement target place is efficiently increased by presenting an advertisement to the user who has taken the operation behavior indicated by the behavior tendency information. Efficiently increasing the number of users who go to the advertisement target place means that, for example, a visitor increase rate due to the advertisement (an increase rate in the number of users who go to the advertisement target place) is high, or a profit rate on advertising (a ratio of increased profits to advertising expenses) is high. For example, in the present embodiment, a conversion rate is a percentage of users who have been to the advertisement target place among users who have taken a specific operation behavior and who have been presented with an advertisement. Further, among users who have taken a specific operation behavior and who have not been presented with the advertisement, a percentage of users who have been to the advertisement target place is referred to as a non-advertisement visitor rate. The visitor increase rate may be calculated, for example, by subtracting the non-advertisement visitor rate from the conversion rate. The profit rate may be calculated based on, for example, a visitor increase rate, an advertisement cost per advertisement (for example, cost per view (CPV), cost per click (CPC), and the like), and a unit price per customer. For example, when an advertisement distribution service is provided in the predetermined Internet integrated service, an advertisement distribution history of the advertisement can be acquired. The behavior tendency information output unit 113 can calculate the conversion rate and the non-advertisement visitor rate, on the basis of the advertisement distribution history, the history of the operation behavior information, the history of the terminal location information, and the like. Whether or not a certain operation behavior is an operation behavior taken before going to the advertisement target place can be determined by, for example, comparing a recording date and time associated with the terminal location information with the operation behavior date and time.

The behavior tendency information output unit 113 may identify, as the tendency of the operation behavior taken by the user who has been to the place, for example, an operation behavior taken by a predetermined percentage or more of users among users who have been to the advertisement target place. The behavior tendency information output unit 113 may identify the tendency of the operation behavior by also regarding, as the users having performed the same operation behavior, a plurality of users who have taken operation behaviors similar to each other, in addition to a plurality of users who have taken operation behaviors completely matching with each other. When there are a plurality of operation behaviors taken by a predetermined percentage or more of users, the behavior tendency information output unit 113 may output behavior tendency information for all of these operation behaviors, or may output the behavior tendency information only for an operation behavior having the highest percentage.

Various tendencies of the operation behavior can be considered. For example, in a case of a web page search, the tendency of the operation behavior may be a tendency of a search condition such as a keyword inputted at the time of searching for the web page. Even if the inputted keywords themselves are different from each other, the behavior tendency information output unit 113 may identify the tendency of the keyword while assuming that substantially the same keywords have been inputted, when those keywords have the same meaning, similar meanings, or the like. Here, the behavior tendency information output unit 113 may determine the keyword or the number of keywords such that the profit rate increases. For example, when a listing advertisement is used, a keyword that is frequently used by a user tends to have a higher advertisement cost and a higher conversion rate. Further, as the number of keywords is smaller, the advertising cost tends to be higher and the conversion rate tends to be higher.

In a case of browsing web pages, the tendency of the operation behavior may be tendencies in web pages or sites to be browsed, tendencies in the categories of web pages or sites to be browsed, tendencies of things published on web pages or sites to be browsed, and the like. The category of each web page and things to be published may be identified in advance by, for example, machine learning. Then, the identified information may be stored in a predetermined database in advance in association with, for example, a URL of each web page or a domain name of each website.

In a case of purchases of items for sale and bookings for services, the tendency of the operation behavior may be tendencies in purchased items for sale or booked services, tendencies in a category of purchased items for sale or booked services, tendencies in a website where items for sale have been purchased, tendencies in a website where services have been booked, and the like.

Further, the behavior tendency information output unit 113 may estimate the operation behavior taken by the user by comprehensively considering a plurality of operation behaviors or a plurality of types of operation behaviors for each user. For example, from the search history and the browse history, it may be possible to estimate that the user is collecting information about travel destination candidates to determine a travel destination. Then, for example, if the fact that the user has actually booked a tourist hotel is obtained from a booking history of the accommodation facility and the like, the estimation can be made more reliable. Such estimation may be performed by, for example, machine learning.

The behavior tendency information output unit 113 may output, together with the behavior tendency information, attribute information indicating an attribute of at least one user who has taken an operation behavior identified as the tendency among users having a user ID associated with terminal location information being substantially the same as designated location information. That is, the behavior tendency information output unit 113 outputs information indicating what attribute the at least one user have and what operation behavior the at least one user take before going to the advertisement target place.

By presenting an advertisement to a user having the attribute indicated by the attribute information among users who have taken the operation behavior indicated by the operation behavior information, it is possible to more efficiently increase the number of users who go to the advertisement target place. The behavior tendency information output unit 113, for example, may first identify the tendency of the operation behavior taken by the user who has been to the advertisement target place, and may subsequently identify an attribute of a predetermined percentage or more of the users among the users who have taken such an operation behavior.

The attribute of each user may be information identified based on information registered by the user, for example, gender, age, residence area, occupation, and the like. Further, the behavior tendency information output unit 113 may determine an attribute of the user who has performed an operation behavior corresponding to the behavior tendency information, on the basis of the history of the operation behavior information. For example, the behavior tendency information output unit 113 may determine that a user who frequently browses web pages about a specific thing has an attribute of being interested in that particular thing. Further, for example, the behavior tendency information output unit 113 may determine that a user who frequently purchases items for sales in a particular category has an attribute of being fond of the items for sale of the category. Further, for example, the behavior tendency information output unit 113 may determine that a user who frequently makes a booking for a tourist hotel has an attribute of being fond of traveling. Further, for example, the behavior tendency information output unit 113 may determine a user attribute further based on the history of the terminal location information. For example, a user identified as having been to an event venue from the terminal location information may like events. Here, based on a search history or a browse history of the user, the behavior tendency information output unit 113 identifies how long the information regarding the event has been searched for and browsed before the time before the event is held. For example, in a case where the user has searched for or browsed information regarding the event for more than a predetermined number of months before the event is held, the behavior tendency information output unit 113 may determine that the user likes events. The behavior tendency information output unit 113 may determine an attribute of each user in advance on the basis of the history of the operation behavior, and store the determined attribute in a database such as the user information DB 31. In addition, the behavior tendency information output unit 113 may automatically update an attribute of each user on the basis of the history of the operation behavior information and the history of the terminal location information that are accumulated every day.

The behavior tendency information output unit 113 may output behavior tendency information indicating the tendency of the operation behavior, and the tendency of an elapsed time until the user terminal 8 is located at the location indicated by the terminal location information being substantially the same as the designated location information after the operation behavior identified as the tendency is taken. That is, the behavior tendency information output unit 113 identifies the tendency of the elapsed time from when the operation behavior identified as the tendency is taken to when the user goes to the advertisement target place. From the tendency of the elapsed time, it is possible to identify a more specific tendency such as which operation behavior the user takes at which time. The behavior tendency information output unit 113 may calculate an elapsed time from when the operation behavior identified as the tendency is taken to when the user goes to the advertisement target place for each user, and determine a representative value of the elapsed time as the tendency of the elapsed time. The representative value may be, for example, an average value, a median value, or the like.

Alternatively, the behavior tendency information output unit 113 may identify the tendency of the elapsed time on the basis of a distribution of the elapsed times. For example, the behavior tendency information output unit 113 may identify a plurality of users who have been to the advertisement target place after taking the operation behavior identified as the tendency, on the basis of the history of the terminal location information stored in the location information DB 41, and a history of the operation behavior stored in the search history DB61, the browse history DB62, or the like. The behavior tendency information output unit 113 may calculate the elapsed time for each of the identified plurality of users. Then, the behavior tendency information output unit 113 may identify, as the distribution of the elapsed time, change information indicating, in accordance with the elapsed time, a change of the number of taking the at least one operation behavior identified as the tendency. For example, the behavior tendency information output unit 113 may classify each elapsed time in accordance with a length of the time. For example, the elapsed times may be classified in units of several hours, one day, one week, or the like. For example, in a case where the elapsed times are classified in units of one week, the elapsed times may be divided into: a range from one week before to the day before the day the user has been to the advertisement target place; a range from two weeks before to the day before the day of one week before; a range from three weeks before to the day before the day of two weeks before; and the like. The behavior tendency information output unit 113 may calculate, as the change information, the number of taking the at least one operation behavior identified as the tendency or the number of appearances of the elapsed time for each range of the elapsed time. Then, based on the change information, the behavior tendency information output unit 113 may identify, as the tendency of the elapsed time, the elapsed time or the range of the elapsed time in which the number of taking the at least one operation behavior identified as the tendency is relatively large. For example, the behavior tendency information output unit 113 may identify only the elapsed time or the range of the elapsed time in which the number of taking the at least one operation behavior is the largest. Alternatively, the behavior tendency information output unit 113 may identify one or more elapsed times or ranges of the elapsed time in which a percentage of the number of taking the at least one operation behavior to the total number of users who have been to the advertisement target place after taking the operation behavior is equal to or greater than a predetermined value. Further, the behavior tendency information output unit 113 may identify the change information and identify the tendency of the elapsed time for each region where the user's address is located. The reason is that the time when the user takes a specific operation behavior may differ depending on a relationship between the region where the address is located and the advertisement target place or depending on a distance between the region where the address is located and the advertisement target place. For example, as the user's address is closer to the address of the advertisement target place, the user may take a specific operation behavior at a time closer to the date for going to the place. Examples of the regions include countries, states, regions, prefectures, municipalities, and the like.

Figure 5:
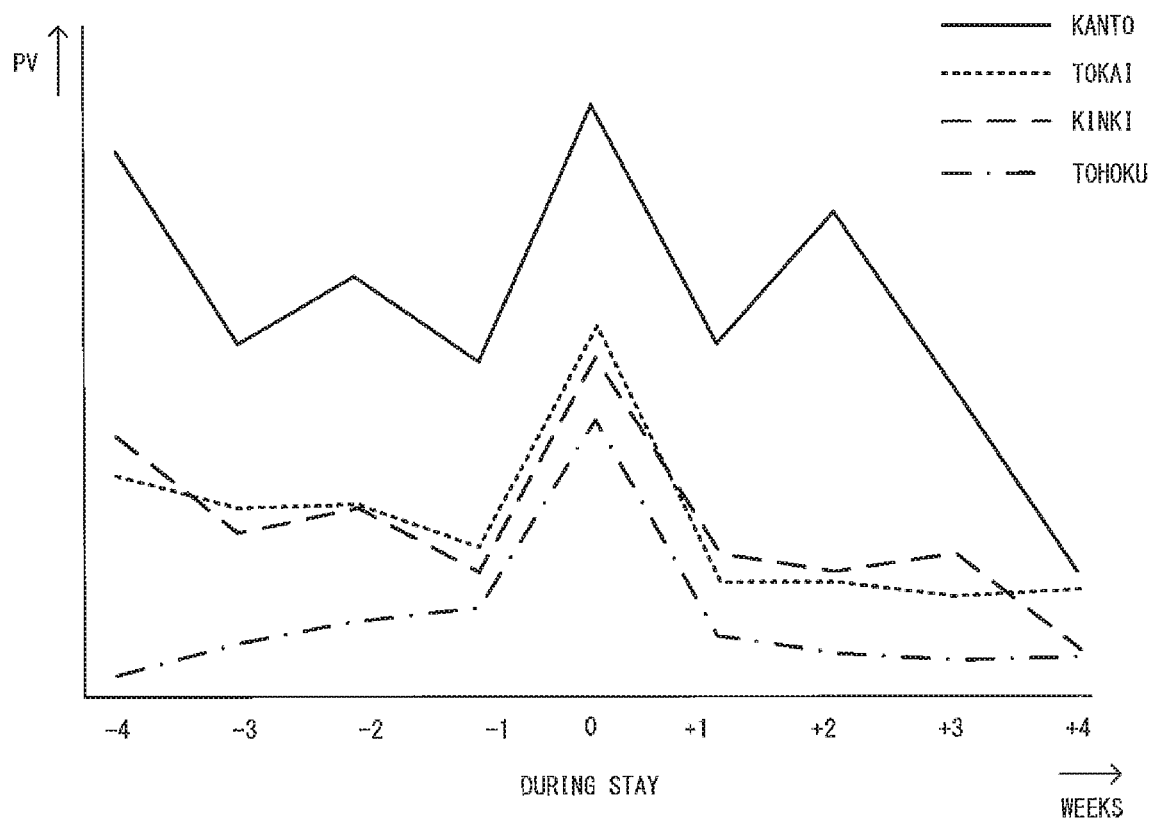
FIG. 5 is a graph showing an example of a change of an operation behavior.
Figure 6:
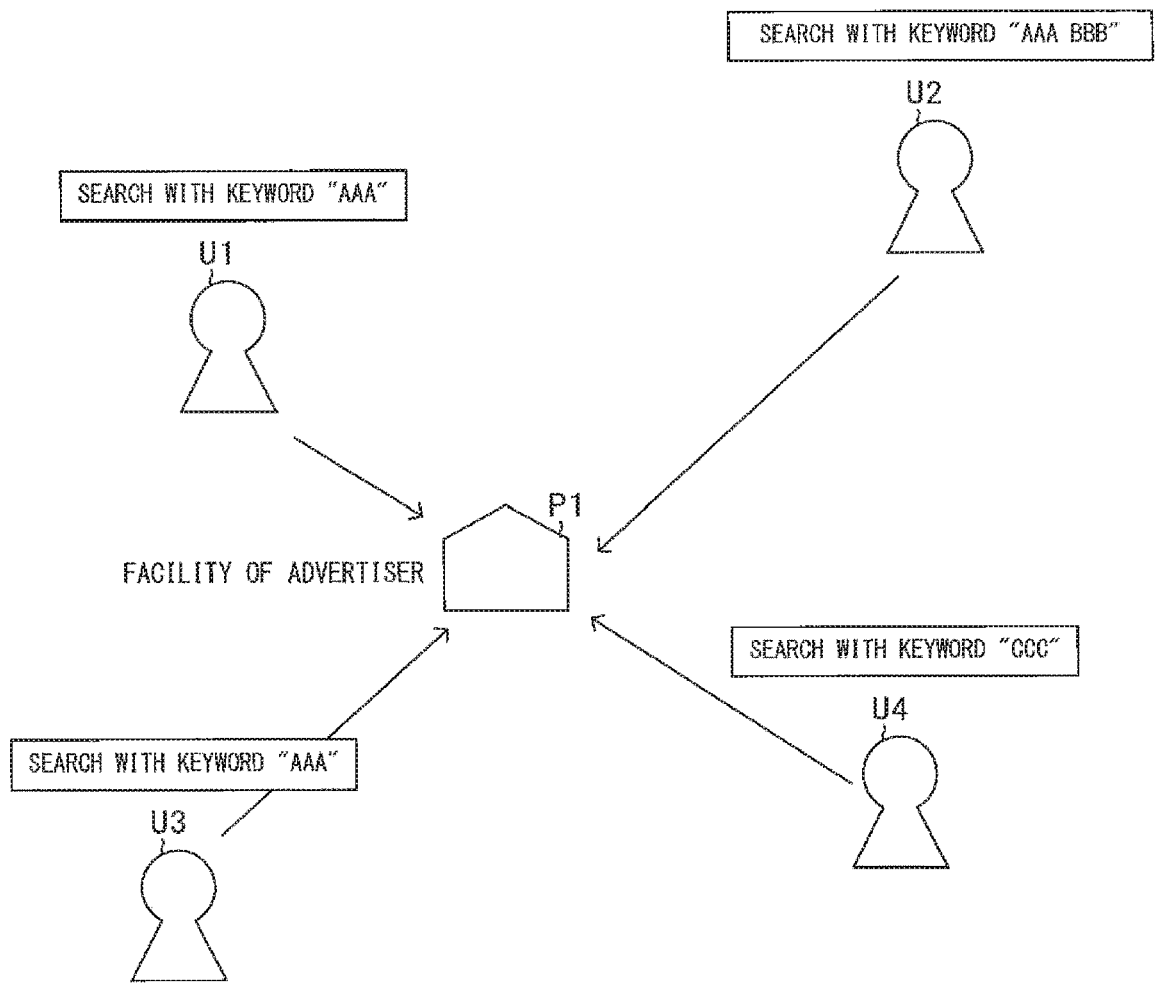
FIG. 6A is a view showing an example of an operation behavior of each user who has been to a certain advertisement target place.
FIG. 6B is a view showing an example of an analysis result to be outputted.

FIG. 5 is a graph showing an example of a change of an operation behavior. For example, suppose that the advertiser is Hokkaido ABC Association. This association is an organization related to tourism promotion in Hokkaido. A place related to Hokkaido ABC Association is Hokkaido, and this association wants to increase users visiting Hokkaido. Therefore, the advertisement target place is Hokkaido. In the graph shown in FIG. 5, a horizontal axis represents a lapse of time in which a day a user has stayed in Hokkaido is set to day 0. A vertical axis indicates a page view (the number of browsing) of a web page about Hokkaido. Therefore, the graph shown in FIG. 5 shows, in accordance with the elapsed time, a change of the page view of the web page about Hokkaido by the user who has been to Hokkaido. Further, FIG. 5 shows a graph of a change of the page view for each region where the user's address is located (for example, Kanto, Tokai, Kinki, and Tohoku). In each region, the number of page views during the stay in Hokkaido is highest. However, the number of taking the at least one operation behavior when the user is at the advertisement target place (that is, the elapsed time is zero) is excluded from the tendency of the elapsed time. The behavior tendency information output unit 113 can determine whether or not the user has been at the advertisement place when the user has performed a specific operation behavior, on the basis of the history of the terminal location information and the designated location information. Further, the number of taking the at least one operation behavior after the user stays at the advertisement target place is excluded. As shown in FIG. 5, a peak of page views by users living in Kanto, Tokai, and Kinki is in a period from four weeks before to the day before the day of three weeks before the users go to Hokkaido. Therefore, the behavior tendency information output unit 113 may identify that users who live in Kanto, Tokai, and Kinki tend to browse a web page about Hokkaido from four weeks before to the day before the day of three weeks before. Whereas, a peak of page views by users living in Tohoku is from one week before the users go to Hokkaido to the day before the users go to Hokkaido. Therefore, the behavior tendency information output unit 113 may identify that users who live in Tohoku tend to browse a web page about Hokkaido from one week before to the day before.

The behavior tendency information output unit 113 may transmit the behavior tendency information and the attribute information as an analysis result, for example, to the management terminal 2. A format of the analysis result may be, for example, a portable document format (PDF), a hypertext markup language (HTML), or the like. The management terminal 2 displays, for example, the analysis result on a screen. Further, for example, an administrator passes the analysis result to the advertiser.

FIG. 6A is a view showing an example of an operation behavior of each user who has been to a certain advertisement target place. A facility P1 is operated by a certain advertiser. To this facility P1, users U1 to U4 have been. Each of the users U1 and U3 has entered a keyword "AAA" to perform a search before going to the facility P1. Before going to the facility P1, the user U2 has entered keywords "AAA" and "BBB" to perform a search.

The user U4 has entered a keyword "CCC" to perform a search before going to the facility P1. Therefore, three of the four users have entered the keyword "AAA". FIG. 6B is a view showing an example of an analysis result to be outputted. For example, as attribute information of a user who tends to go to the facility P1, gender "male", age "30s", address "Setagaya-ku, Tokyo", occupation "company employee", hobby "golf" and the like are shown. Further, as a search behavior that the user who goes to the facility P1 tends to take, the behavior tendency information indicates that the user has performed a search by inputting the keyword "AAA" a few days before going to the facility P1.

The advertiser posts advertisement information indicating an advertisement of the advertisement target place on the basis of the behavior tendency information obtained as a result of the analysis. For example, when the behavior tendency information indicates a tendency of a search behavior, the advertisement information may be registered as a listing advertisement in a search engine such as the web search server 5. The advertiser registers a keyword indicated by the behavior tendency information, together with the advertisement information. Further, the advertiser may further register a user attribute indicated by the attribute information obtained together with the behavior tendency information. For example, when a registered keyword is inputted by a user having a registered attribute, the search engine displays the advertisement information of the advertiser in a priority order based on a bid amount and the like of the keyword.

When the behavior tendency information indicates a tendency of a browsing behavior on a web page, the advertisement information may be registered in, for example, a demand side platform (DSP). The advertiser registers the advertisement information, and also registers a website that is likely to be browsed and is indicated by the behavior tendency information, or information indicating an advertisement space or the like of the website. Further, the advertiser registers a user attribute indicated by the attribute information. When the registered advertisement space of the website is browsed by a user having the registered attribute, automatic bidding for the advertisement space is executed. Then, if a successful bid from the advertiser is made, the advertisement information of the advertiser is displayed in the advertisement space of the website.

The behavior tendency information output unit 113 may output behavior tendency information indicating a series of operation behaviors that are likely to be taken by at least one user having the user ID associated with the terminal location information being substantially the same as the designated location information. That is, the behavior tendency information output unit 113 may identify, in which order, which plurality of operation behaviors are likely to taken by the user who has been to the advertisement target place before going to the place. Depending on the advertisement target place, the user may tend to sequentially take a plurality of specific operation behaviors before going to the advertisement target place. Even if a certain user takes a single operation behavior that is likely to be taken before going to a certain advertisement target place, the user may not have a probability of going to the advertisement target place. One of the reasons is that there may be many places where the same tendency of the operation behavior can be seen other than the advertisement target place. Whereas, it is considered that, as a user takes more behaviors in a series of operation behaviors that are likely to be taken before going to the advertisement target place, the user consciously or unconsciously becomes more interested in the advertisement target place. Therefore, by distributing the advertisement information to the user who has taken such operation behaviors, the probability that the user will go to the advertisement target place is further increased.

The plurality of operation behaviors that constitute the series of operation behaviors are not required to be continuous. The behavior tendency information output unit 113 may identify a series of operation behaviors taken by a predetermined percentage or more of users, for example, among users who have been to the advertisement target place, as a tendency of the series of operation behaviors of the users who have been to the place. The behavior tendency information output unit 113 may output behavior tendency information indicating a tendency of the series of operation behaviors and a tendency of a time interval between operation behaviors in the series of operation behaviors. Information indicating how much time has elapsed from when a certain operation behavior is taken to when the next operation behavior is taken is also useful as a tendency of the operation behavior.

Figure 7:
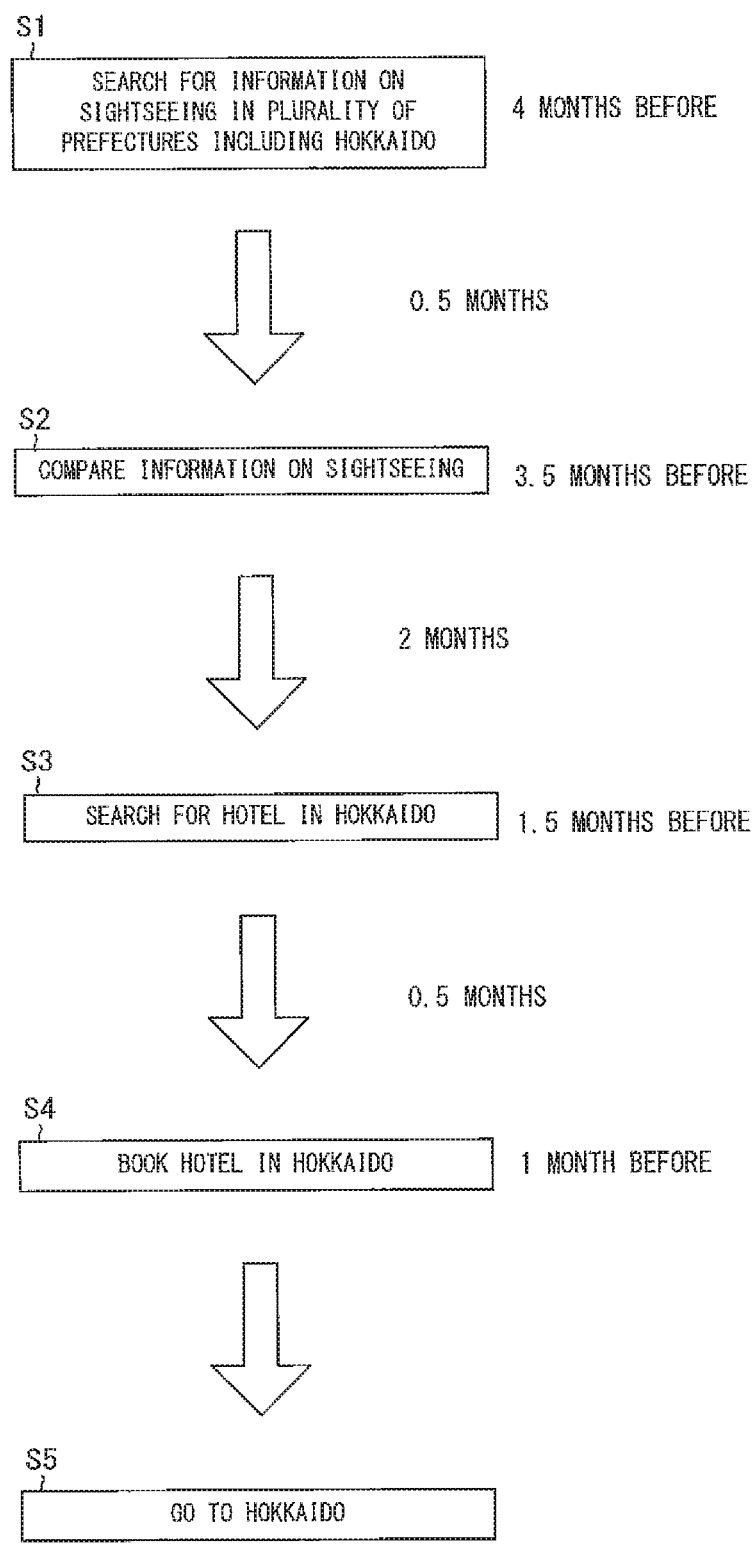
FIG. 7 is a view showing an example of a series of operation behaviors that a user who has been to a certain advertisement target place tends to take.

FIG. 7 is a view showing an example of a series of operation behaviors that a user who has been to a certain advertisement target place tends to take. For example, suppose that the advertiser is Hokkaido ABC Association. This association is an organization related to tourism promotion in Hokkaido. A place related to Hokkaido ABC Association is Hokkaido, and this association wants to increase users visiting Hokkaido. As shown in FIG. 7, users traveling to Hokkaido tend to search for information on sightseeing in some prefectures, for example, about four months before going to Hokkaido (stage S1). This operation behavior is estimated based on keywords obtained from the search history and the browse history, websites browsed after the search, and the like. The target prefectures include Hokkaido. Half a month later (three and a half months before going to Hokkaido), the users tends to compare information on sightseeing spots between prefectures (stage S2). This operation behavior is estimated based on contents and the like of browsed websites obtained from the browse history. Two months later (one and a half months before going to Hokkaido), the users tend to search for a hotel in Hokkaido on an accommodation facility booking site (stage S3). This operation behavior can be identified from a search history and a browse history in the booking site. Half a month later (one month before going to Hokkaido), the users tend to book a hotel in Hokkaido on an accommodation facility booking site (stage S4). This operation behavior can be identified from a booking history on the booking site. Then, the user goes to Hokkaido (stage S5).

The behavior tendency information output unit 113 may also identify change information as described above for the time interval between the operation behaviors. Then, the behavior tendency information output unit 113 may identify the tendency of the time interval between operation behaviors on the basis of the change information. For example, the behavior tendency information output unit 113 may divide time intervals between two operation behaviors into a plurality of time ranges. The behavior tendency information output unit 113 may calculate the number of times the two operation behaviors have been performed for each time range. Then, the behavior tendency information output unit 113 may identify a time interval or a range of the time interval in which the calculated number is relatively large, as the tendency of the time interval. For example, in FIG. 7, the behavior tendency information output unit 113 may identify how many days before the examination of information (step S2) there is a peak in the number of information searches (step S1). Then, the behavior tendency information output unit 113 may identify the identified number of days as the tendency of the time interval. The two operation behaviors are not limited to consecutive operation behaviors. For example, the behavior tendency information output unit 113 may use the change information when identifying the tendency of the time interval between information searches (step S1) and searching for a hotel in Hokkaido (step S3). In addition, the behavior tendency information output unit 113 may use the change information to identify, for at least one operation behavior in the series of operation behaviors, the tendency of the elapsed time from when the operation behavior is performed to when the user goes to the advertisement target place. In this case, the operation behavior and going to the advertisement target place may or may not be continuous. For example, the behavior tendency information output unit 113 may identify the tendency of the elapsed time from the time when the information searches are performed (step S1) until the user goes to Hokkaido (step S5), or may identify the tendency of the elapsed time from the time when the information is examined (step S2) until the user goes to Hokkaido (step S5).

[1-4. Operation of Behavioral Analysis Server]

Figure 8:
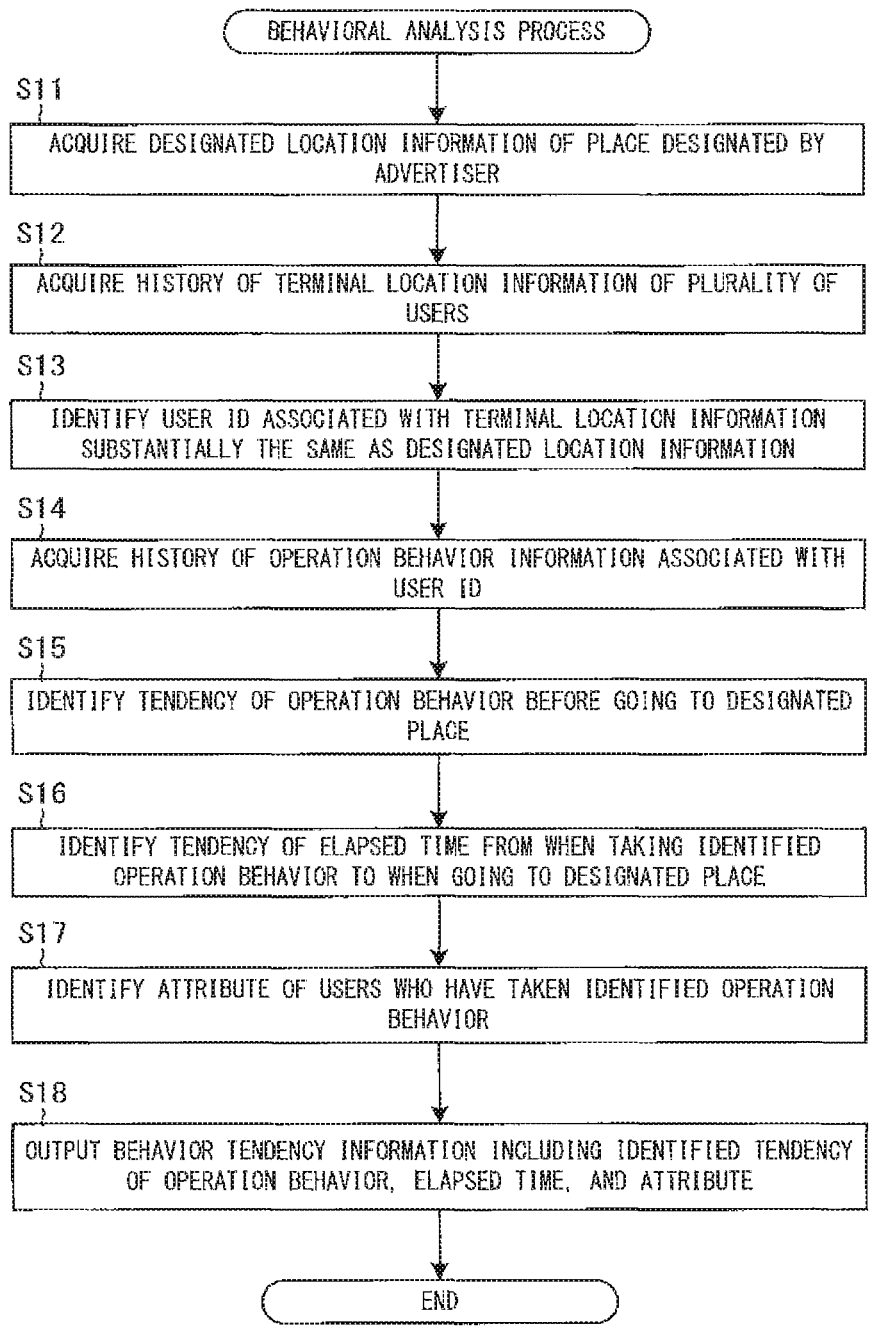
FIG. 8 is a flowchart showing an example of a behavioral analysis process by the system controller of the behavioral analysis server.

Next, an operation of the behavioral analysis server 1 will be described with reference to FIG. 8. FIG. 8 is a flowchart showing an example of a behavioral analysis process by the system controller 11 of the behavioral analysis server 1. For example, an administrator who has received an analysis request from an advertiser operates the management terminal 2 and inputs designated location information for an advertisement target place. For example, when the behavioral analysis server 1 receives the designated location information from the management terminal 2, the system controller 11 executes the behavioral analysis process.

As shown in FIG. 8, the designated location information acquisition unit 111 acquires the designated location information received from the management terminal 2 (step S11). Next, the behavior history acquisition unit 112 acquires a history of the terminal location information of the plurality of users from, for example, the location information DB 41 (step S12). The behavior history acquisition unit 112 identifies, from the acquired history of the terminal location information, terminal location information being substantially the same as the designated location information. Then, the behavior history acquisition unit 112 identifies a user ID associated with the identified terminal location information from the location information DB 41 (step S13). The behavior history acquisition unit 112 acquires a history of operation behavior information associated with the identified user ID from a database that stores the history, for example, the search history DB 61 and the browse history DB 62 (step S14). Here, for each user, the behavior history acquisition unit 112 acquires a history of the operation behavior information in which an operation behavior date and time is before a date and time when the user has been to the advertisement target place (a recording date and time of the terminal location information being substantially the same as the designated location information).

Next, based on the acquired history of the operation behavior information, the behavior tendency information output unit 113 identifies a tendency of an operation behavior taken by the at least one user who has been to the advertisement target place before going to the place (step S15). Here, the behavior tendency information output unit 113 identifies, from the history of the operation behavior information, an operation behavior that has a common or similar tendency among users who have been to the advertisement target place. The behavior tendency information output unit 113 may identify one operation behavior or a series of operation behaviors including a plurality of operation behaviors, as the tendency of the operation behavior. In addition, based on the operation behavior date and time of the at least one user who has taken the operation behavior identified as the tendency and the date and time when the at least one user has been to the advertisement target place, the behavior tendency information output unit 113 identifies a tendency of an elapsed time from when the operation behavior identified as the tendency is taken to when the user goes to the advertisement target place (step S16). When a series of operation behaviors is identified, the behavior tendency information output unit 113 may identify a tendency of a time interval between operation behaviors in the series of operation behaviors, on the basis of the operation behavior date and time. Next, based on an attribute stored in the user information DB 31 and an attribute identified from the history of the operation behavior information, the behavior tendency information output unit 113 identifies an attribute of the user who has taken the operation behavior identified as the tendency (step S17). Next, the behavior tendency information output unit 113 outputs the behavior tendency information indicating the identified tendency of the operation behavior and the identified tendency of the elapsed time, and the attribute information indicating the identified attribute, to the management terminal 2 (step S18), and ends the behavioral analysis process.

As described above, according to the present embodiment, the behavioral analysis server 1 acquires the designated location information regarding the location of the advertisement target place. Further, the behavioral analysis server 1 acquires, for a plurality of users, from the location information DB 41, the history of the terminal location information regarding the location of the user terminal 8, and the user ID associated with the terminal location information. Further, the behavioral analysis server 1 acquires, from the search history DB 61 or the browse history DB 62, the history of operation information indicating the operation behavior taken through the terminal operation by at least one user having the user ID. In addition, the behavioral analysis server 1 identifies the user ID associated with the terminal location information being substantially the same as the designated location information. In addition, the behavioral analysis server 1 outputs, for distribution of information regarding the advertisement target place, behavior tendency information indicating a tendency of an operation behavior taken by a user having the identified user ID and taken before the time when the user terminal 8 is located at the location indicated by the terminal location information being substantially the same as the designated location information. This causes output of behavior tendency information indicating an operation behavior that is likely to be taken by the user who has been to the advertisement target place before going to the place. Before going to a certain place, a user may tend to take a specific operation behavior, consciously or unconsciously. Therefore, by distributing information related to the place to a user who has taken an operation behavior same as or similar to the operation behavior indicated by the outputted behavior tendency information, it is possible to increase the number of users who visit the place.

In addition, the behavioral analysis server 1 may output behavior tendency information and attribute information indicating an attribute of at least one user who has taken an operation behavior indicated by the behavior tendency information, among users having a user ID associated with the terminal location information being substantially the same as the designated location information. This causes further output of attribute information indicating an attribute of the at least one user who has taken the operation behavior identified as the tendency and has been to the advertisement target place. In this case, by distributing information related to the place to a user whose attribute is the same as or similar to the attribute indicated by the attribute information, it is possible to increase the number of users who visit the place.

Further, the behavioral analysis server 1 may determine an attribute of the at least one user who has taken the operation behavior indicated by the behavior tendency information on the basis of the operation information. In this case, from the user's operation behavior, it is possible to identify the attribute of the at least one user who has taken the operation behavior identified as the tendency and has been to the advertisement target place.

In addition, the behavioral analysis server 1 may output behavior tendency information indicating the tendency of the operation behavior, and the tendency of an elapsed time from when the operation behavior is taken to when the at least one user terminal 8 is located at the location indicated by the terminal location information being substantially the same as the designated location information. In this case, it is possible to identify a tendency of a length of time from when the at least one user has taken the operation behavior identified as the tendency to when going to the advertisement target place.

In addition, the behavioral analysis server 1 may output behavior tendency information indicating a series of operation behaviors that are likely to be taken by at least one user having the user ID associated with the terminal location information being substantially the same as the designated location information. This causes output of behavior tendency information indicating a series of operation behaviors that are likely to be taken by the at least one user who has been to the advertisement target place before going to the place. Depending on the place, the at least one user may tend to sequentially take a plurality of specific operation behaviors before going to the place, consciously or unconsciously. In this case, by distributing information related to the place to at least one user who has taken operation behaviors same as or similar to some or all of the series of operation behaviors indicated by the behavior tendency information, it is possible to increase the number of users who visit the place.

In addition, the behavioral analysis server 1 may output behavior tendency information indicating a tendency of a series of operation behaviors and a tendency of a time interval between operation behaviors in the series of operation behaviors. This causes output of behavior tendency information further indicating a length of time from when a certain operation behavior is taken to when the next operation behavior is taken in the series of operation behaviors. In this case, by distributing information related to the designated place to at least one user who has taken operation behaviors at the same time interval as or a relatively close time interval to the time interval indicated by the behavior tendency information, it is possible to increase the number of users who visit the place.

2. Second Embodiment

The present embodiment is an embodiment when the present invention is applied to an advertisement distribution system that analyzes users' behaviors for distributing an advertisement, and distributes the advertisement on the basis of an analysis result.

[2-1. Configuration of Advertisement Distribution System]

Figure 9:
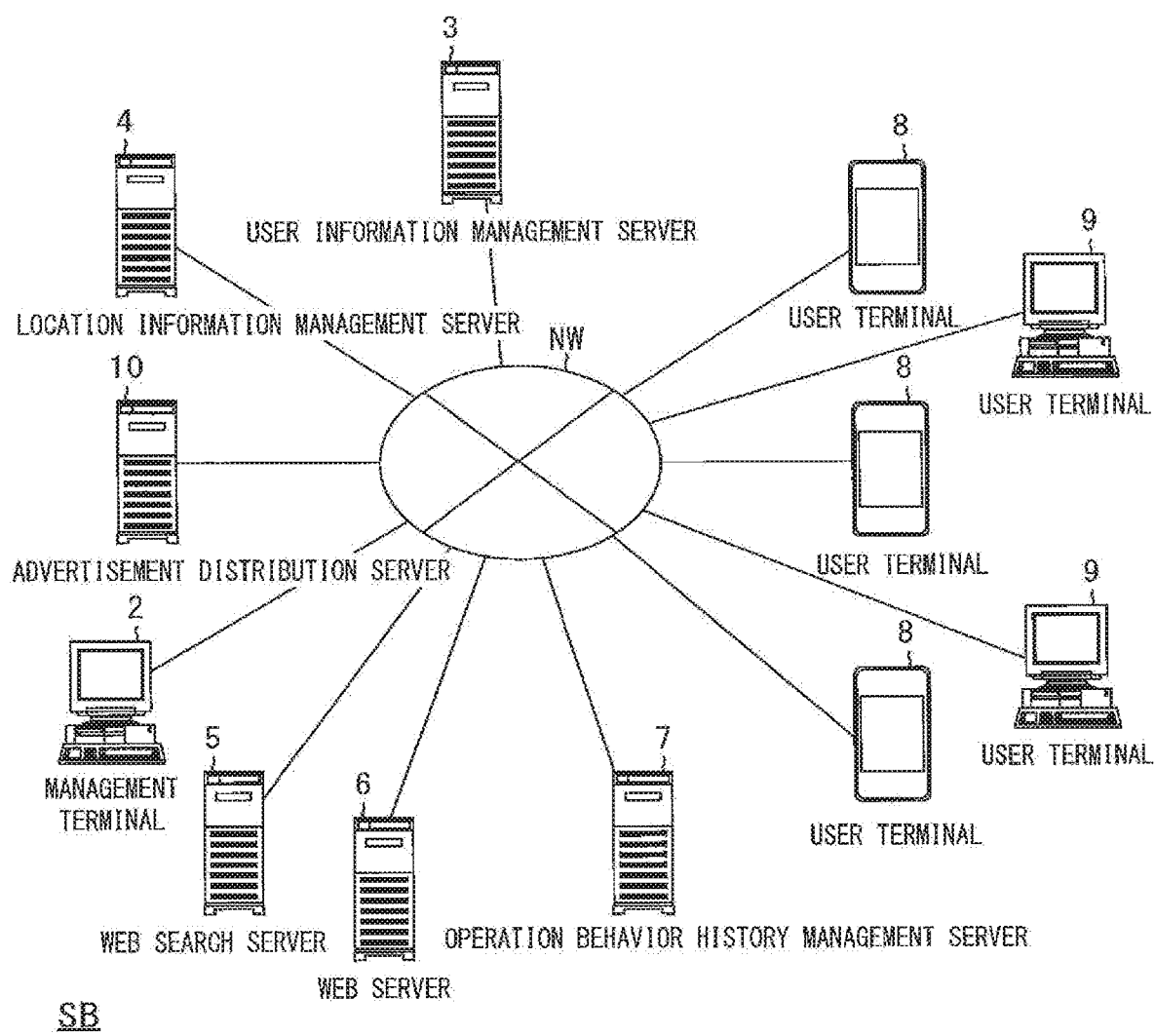
FIG. 9 is a diagram showing an example of a schematic configuration of an advertisement distribution system according to one embodiment.
Figure 10:
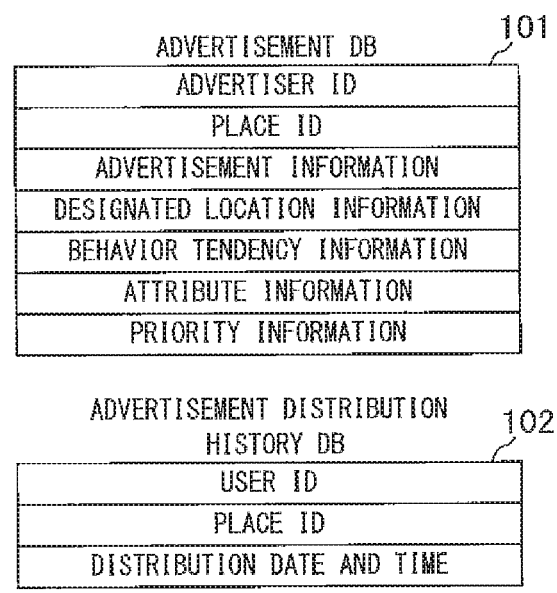
FIG. 10 is a view showing an example of information stored in databases in an advertisement distribution server.

First, an outline of a configuration and functions of an advertisement distribution system SB according to the present embodiment will be described with reference to FIGS. 9 and 10. FIG. 9 is a diagram showing an example of a schematic configuration of the advertisement distribution system SB according to the present embodiment. FIG. 10 is a view showing an example of information stored in databases in an advertisement distribution server 10.

As shown in FIG. 9, the advertisement distribution system SB includes the advertisement distribution server 10, a management terminal 2, a user information management server 3, a location information management server 4, a web search server 5, a web server 6, an operation behavior history management server 7, a plurality of user terminals 8, and a plurality of user terminals 9. The advertisement distribution system SB differs from the behavioral analysis system SA in that the advertisement distribution server 10 is provided instead of the behavioral analysis server 1. The management terminal 2, the user information management server 3, the location information management server 4, the web search server 5, the web server 6, the operation behavior history management server 7, the user terminals 8, and the user terminals 9 are basically the same as those in the behavioral analysis system SA.

The advertisement distribution server 10 is a server device that distributes advertisement information. The advertisement distribution server 10 is connected to the network NW.

Examples of a distribution form of the advertisement information include a listing advertisement, real-time bidding, a banner advertisement, a video advertisement, an e-mail advertisement, and the like. For example, the advertisement distribution server 10 may cause the advertisement information to be displayed in a search result displayed on the user terminal 9, in response to a search being executed via a web page search add-on in the user terminal 9. Further, for example, the advertisement distribution server 10 may cause the advertisement information to be displayed on a web page transmitted from the web server 6 to the user terminal 8 or 9. The advertisement distribution server 10 has a configuration and functions of the behavioral analysis server 1. The advertisement distribution server 10 has the configuration shown in FIG. 3. Note that the advertisement distribution server 10 and the behavioral analysis server 1 may be separately provided. In this case, the advertisement distribution server 10 distributes the advertisement information on the basis of a result of the behavioral analysis by the behavioral analysis server 1.

A storage unit 14 of the advertisement distribution server 10 stores databases such as an advertisement DB 101 and an advertisement distribution history DB 102. The advertisement DB 101 stores information on a plurality of advertisements. For example, the advertisement DB 101 stores an advertiser ID, a place ID, advertisement information, designated location information, behavior tendency information, attribute information, priority information, and the like for each piece of advertisement information. The advertiser ID is identification information for identifying an advertiser. The place ID is identification information for identifying an advertisement target place. The advertisement information indicates an advertisement for encouraging a user to go to the advertisement target place. The advertisement information may be, for example, text data, still image data, video data, audio data, or the like, or may be formed by at least two types of data among these data. The designated location information indicates a location of the advertisement target place. The behavior tendency information indicates an operation behavior that at least one user who has been to the advertisement target place tends to take before going to the place. The behavior tendency information may indicate a tendency of a series of operation behaviors, that is, which plurality of operation behaviors are likely to be taken in which order. The behavior tendency information may further include an attribute of at least one user who takes the operation behavior, and a tendency of an elapsed time from when the operation behavior is taken to when the at least one user goes to the advertisement target place. Further, the behavior tendency information may indicate a series of operation behaviors that a user who has been to the advertisement target place tends to take before going to the place. The attribute information indicates an attribute of the user who has taken the operation behavior indicated by the behavior tendency information and has been to the advertisement target place. The priority information indicates a priority degree of distribution of the advertisement information related to the place corresponding to the priority information, for example, in comparison with the advertisement information related to another place. When the behavior tendency information indicates a tendency of a series of operation behaviors, the priority information may indicate, for example, a priority degree of the distribution of the advertisement information for each operation behavior, in a comparison between the operation behaviors included in the series of operation behaviors. The priority information may be, for example, a conversion rate, a visitor increase rate, a profit rate, or the like, or may be determined based on at least one of these pieces of information. As the conversion rate, the visitor increase rate, or the profit rate is higher, the priority becomes higher.

The advertisement information may be related to an event that is held at a predetermined time at the advertisement target place. For example, the advertisement information may indicate that the event is held at a predetermined time at the advertisement target place. For example, when the advertisement target place is Hokkaido, the advertisement information may indicate that a snow festival will be held from February 1 to February 11. In this case, the advertisement DB 101 may further store time information indicating a time when the event is held. The time information may be, for example, a date or a period. The event is not particularly limited as long as it is related to the advertisement target place.

The advertisement distribution history DB 102 stores a distribution history of the advertisement information. For example, the advertisement distribution history DB 102 stores a user ID, a place ID, a distribution date and time, and the like as the distribution history in association with each other for each advertisement information distribution. The user ID indicates a user to whom the advertisement information is distributed. That is, the user ID indicates a user whose user terminal 8 or 9 has received the advertisement information. The place ID indicates the advertisement target place for which the advertisement information has been distributed to the user terminal 8 or 9. The distribution date and time indicates a date and time when the advertisement information has been distributed. The storage unit 14 further stores an advertisement distribution program. The advertisement distribution program is a program that causes the system controller 11 to execute processing for distributing advertisement information.

[2-2. Outline of Functions of System Controller]

Figure 11:
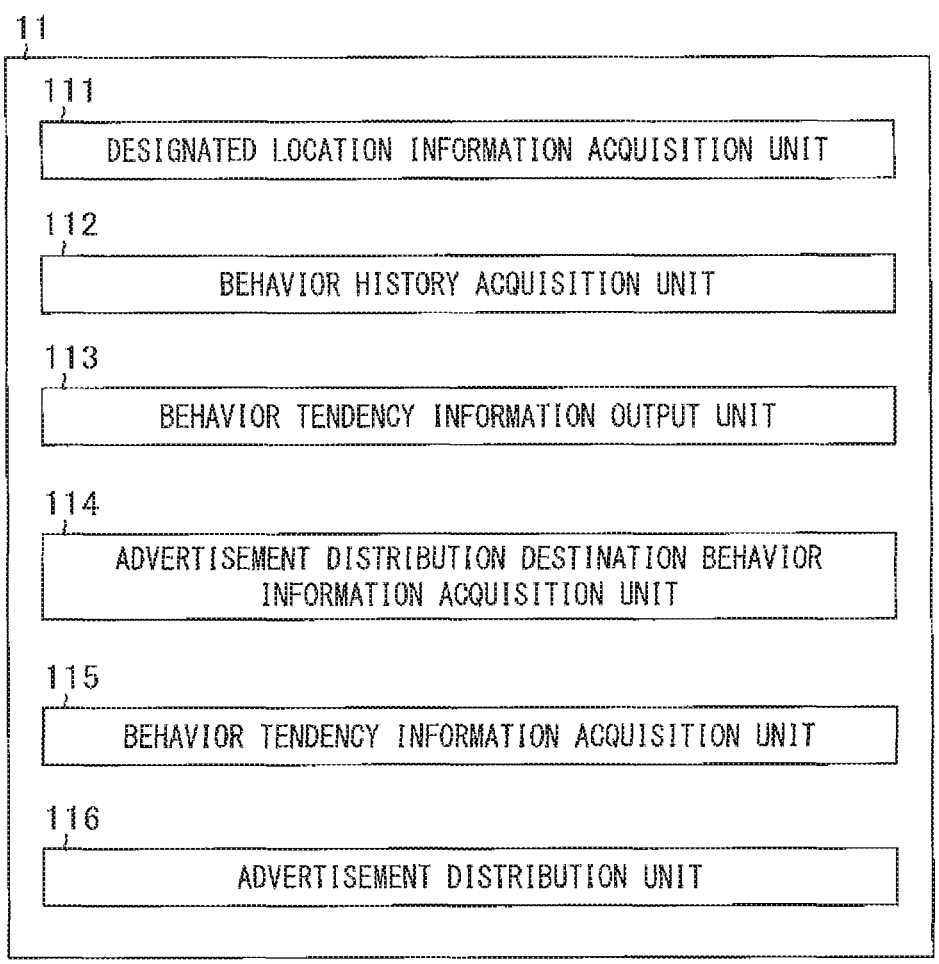
FIG. 11 is a diagram showing an example of functional blocks of the system controller of the advertisement distribution server according to one embodiment.

Next, an outline of functions of the system controller 11 of the advertisement distribution server 10 will be described with reference to FIGS. 11 to 13. FIG. 11 is a diagram showing an example of functional blocks of the system controller 11 of the advertisement distribution server 10 according to the present embodiment. The system controller 11 functions as, as shown in FIG. 11, a designated location information acquisition unit 111, a behavior history acquisition unit 112, a behavior tendency information output unit 113, an advertisement distribution destination behavior information acquisition unit 114, a behavior tendency information acquisition unit 115, an advertisement distribution unit 116, and the like, by the CPU 11a reading and executing various program codes included in a behavioral analysis program and the advertisement distribution program.

Functions of the designated location information acquisition unit 111, the behavior history acquisition unit 112, and the behavior tendency information output unit 113 may be basically the same as those of the behavioral analysis server 1. The behavior tendency information output unit 113 stores the behavior tendency information and the attribute information generated by the behavior tendency information output unit 113 in the advertisement DB 101 in association with the advertiser ID, the place ID, the advertisement information, the designated location information, and the like. An output destination of the behavior tendency information in this case is the storage unit 14. The behavior tendency information output unit 113 may or may not transmit the behavior tendency information to the management terminal 2.

The advertisement distribution destination behavior information acquisition unit 114 acquires operation behavior information indicating at least one operation behavior taken through at least one terminal operation on the user terminal 8 or 9 of a distribution destination user to which the advertisement information is to be distributed. The advertisement distribution destination behavior information acquisition unit 114 may acquire operation behavior information indicating a current operation behavior. For example, in a case of a web page search, the user terminal 8 or 9 transmits a search request to the operation behavior history management server 7. At this time, the advertisement distribution destination behavior information acquisition unit 114 may acquire a search request, for example, from the operation behavior history management server 7, and acquire a search condition such as a keyword included in the search request as the operation behavior information. Further, for example, in a case of web page browsing, the user terminal 8 or 9 transmits a web page request to the web server 6. At this time, the advertisement distribution destination behavior information acquisition unit 114 may acquire a request, for example, from the web server 6, and acquire a URL included in the request as operation behavior information. The advertisement distribution destination behavior information acquisition unit 114 may acquire operation behavior information indicating a past operation behavior or a history thereof. For example, the advertisement distribution destination behavior information acquisition unit 114 acquires a user ID of the distribution destination user from the search request or the web page request. The advertisement distribution destination behavior information acquisition unit 114 may acquire a history of the operation behavior information such as a search history and a browse history associated with the user ID, from the operation behavior history management server 7. Further, the advertisement distribution destination behavior information acquisition unit 114 may acquire both the current operation behavior information and the history of the past operation behavior information. The advertisement distribution destination behavior information acquisition unit 114 may acquire an attribute of the distribution destination user together with the operation behavior information. Further, the advertisement distribution destination behavior information acquisition unit 114 may acquire terminal location information regarding a location of the user terminal 8 used by the distribution destination user, together with the operation behavior information. For example, the user terminal 8 transmits terminal location information indicating the current location of the user terminal 8, together with the search request or the web page request.

The behavior tendency information acquisition unit 115 acquires behavior tendency information from the advertisement DB 101. The behavior tendency information acquisition unit 115 may acquire, from the advertisement DB 101, at least any one of designated location information, attribute information, and priority information associated with the behavior tendency information, together with the behavior tendency information.

The advertisement distribution unit 116 compares the operation behavior information acquired by the advertisement distribution destination behavior information acquisition unit 114 with the behavior tendency information acquired by the behavior tendency information acquisition unit 115. Then, when the operation behavior information of the distribution destination user corresponds to the behavior tendency information, the advertisement distribution unit 116 distributes the advertisement information associated with the behavior tendency information to the user terminal 8 or 9 of the distribution destination user. The fact that operation behavior information corresponds to the behavior tendency information means that the operation behavior taken by the distribution destination user is the same as or similar to the tendency of the operation behavior indicated by the behavior tendency information. The advertisement distribution unit 116 may distribute the advertisement information associated with the behavior tendency information, when the operation behavior information of the distribution destination user corresponds to the behavior tendency information, and an attribute of the distribution destination user is the same as or similar to the attribute indicated by the attribute information associated with the behavior tendency information. In other words, the advertisement distribution unit 116 distributes advertisement information regarding the place to a user who has taken an operation behavior same as or similar to the operation behavior that is likely to be taken by at least one user who has been to the advertisement target place before going to the place, among users having an attribute same as or similar to the attribute of the at least one user who has been to the advertisement target place. A user who has taken an operation behavior same as or similar to the operation behavior that is likely to be taken by the at least one user who has been to the advertisement target place also has a probability of going to that place. Therefore, the number of users who visit the advertisement target place can be increased.

The advertisement distribution unit 116 may acquire a visitor increase rate. Then, the advertisement distribution unit 116 may control distribution of the advertisement information on the basis of the visitor increase rate. For example, the advertisement distribution unit 116 may distribute advertisement information whose visitor increase rate is equal to or greater than a predetermined value, and may not distribute advertisement information whose visitor increase rate is less than the predetermined value. Alternatively, the advertisement distribution unit 116 sets a higher priority of distribution of the advertisement information as the advertisement information has a higher visitor increase rate.

The behavior tendency information of any of the two or more advertisement target places may correspond to the operation behavior information of the distribution destination user. In that case, the advertisement distribution unit 116 may determine which advertisement target place is to be prioritized for distribution of the advertisement information. For example, when advertisement information is distributed to the user terminal 8, which is a portable terminal, the advertisement distribution unit 116 may acquire a distance from a current location of the user terminal 8 to the advertisement target place for each of the two or more advertisement target places, on the basis of the terminal location information of the user terminal 8 of the distribution destination user acquired by the advertisement distribution destination behavior information acquisition unit 114 and the designated location information of the advertisement target place. The advertisement distribution unit 116 may set a higher priority to the distribution of the advertisement information as the advertisement target place is closer to the user terminal 8. As the place is closer to the current location, the distribution destination user can visit the place more easily. Therefore, the number of users who visit the advertisement target place can be increased. FIG. 12A is a view showing an example of determining a place for which advertisement information is distributed on the basis of distances. For example, a user U5 has entered a keyword "AAA" to search for a web page. Whereas, for each of places P1 and P2, at least one user who goes to the place tends to perform a search by entering the keyword "AAA". Therefore, the advertisement information of the places P1 and P2 is to be a distribution candidate. A distance from a current location of the user U5 to the place P1 is 1 km, and a distance from the current location of the user U5 to the place P2 is 2 km. Therefore, the advertisement distribution unit 116 distributes the advertisement information on the place P1 to the user terminal 8 of the user U5.

In addition, the advertisement distribution unit 116 may acquire a conversion rate, or a visitor increase rate or a profit rate due to the distribution of the advertisement information, for each of the two or more advertisement target places. The advertisement distribution unit 116 may set a higher priority to the distribution of advertisement information as the place has a higher conversion rate. As the conversion rate of the place is higher, the distribution destination user is more likely to visit. Therefore, the number of users who visit the advertisement target place can be increased. As described above, the conversion rate is a percentage of users whose terminal location information of the user terminal 8 or 9 being substantially the same as the designated location information after the distribution of the advertisement information, among the users to whom advertisement information has been distributed on the user terminal 8 or 9, that is, a percentage of users who have been to the advertisement target place. The conversion rate can be calculated based on the location information DB 41 and the advertisement distribution history DB 102. For example, the advertisement distribution unit 116 may periodically calculate a conversion rate for each advertisement place, and store the conversion rate in the advertisement DB 101 in advance as priority information. FIG. 12B is a view showing an example of determining a place for which advertisement information is distributed on the basis of conversion rates. As in the case of FIG. 12A, the user U5 has entered the keyword "AAA". Therefore, the advertisement information of the places P1 and P2 is to be a distribution candidate. The conversion rate of place P1 is 0.1, and the conversion rate of place P2 is 0.3. Therefore, the advertisement distribution unit 116 distributes the advertisement information on the place P2 to the user terminal 8 of the user U5. The advertisement distribution unit 116 may determine which advertisement target place is to be prioritized for the distribution of the advertisement information, on the basis of both the distance from the location of the user terminal 8 to the advertisement target place and the conversion rate.

When controlling the distribution of advertisement information related to an event to be held at a predetermined time at the advertisement target place, the advertisement distribution unit 116 may use a tendency of an elapsed time from when the operation behavior is taken to when the at least one user goes to the advertisement place. As described in the first embodiment, suppose that the analysis of the operation behavior and the analysis of the behavior of going to the advertisement target place result in that the behavior tendency information output unit 113 has identified an elapsed time having a relatively large number of operation behaviors indicated by the behavior tendency information acquired by the behavior tendency information acquisition unit 115 on the basis of the change information. In this case, when the operation behavior information of the distribution destination user corresponds to the behavior tendency information, and the operation behavior indicated by the operation behavior information is taken by the distribution destination user before the identified elapsed time from a time when the event is held, the advertisement distribution unit 116 may distribute the advertisement information to the user terminal 8 or 9 of the distribution destination user. A user who has taken an operation behavior that is likely to be taken by the user who goes to the advertisement target place may go to the advertisement target place after the time identified as the tendency has elapsed after taking the operation behavior. By presenting advertisement information related to an event after the time identified as the tendency elapses when the operation behavior is taken, it is possible to increase the probability that the user will go to the advertisement target place to experience the event.

Figure 13:
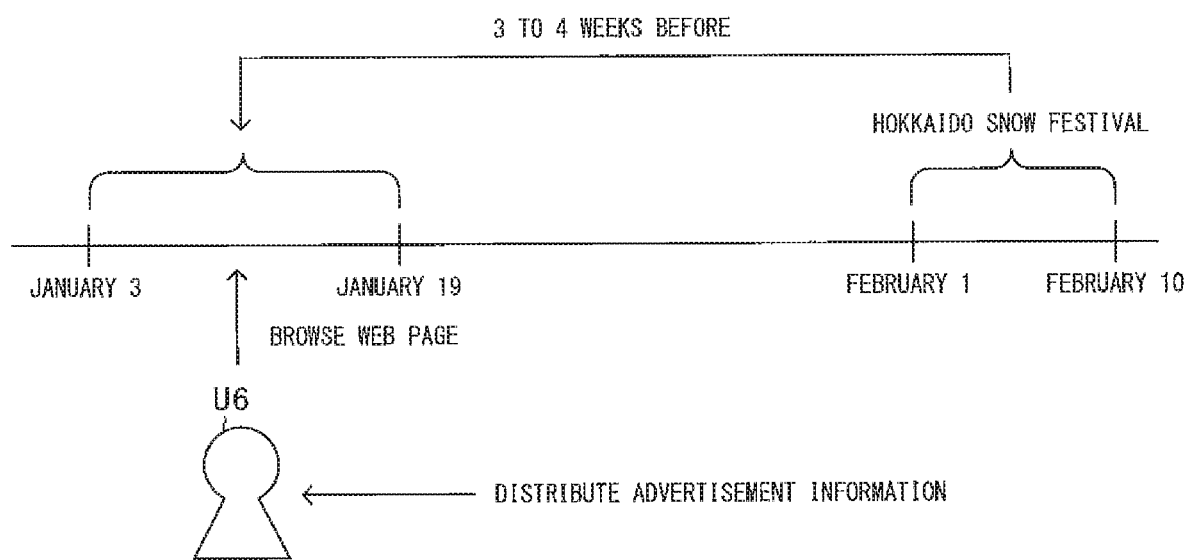
FIG. 13 is a view showing an example of a relationship between a time when a user takes an operation behavior and a time when an event occurs.

FIG. 13 is a view showing an example of a relationship between a time when a user takes an operation behavior and a time when an event occurs. For example, the advertisement target place is Hokkaido, and the advertisement information indicates that a snow festival is held in Hokkaido from February 1 to February 11. As shown in FIG. 5, a peak of page views of a web page about Hokkaido by users living in Kanto is in a range from four weeks before to the day before the day of three weeks before going to Hokkaido. Therefore, the behavior tendency information indicates that the tendency of the elapsed time is from four weeks before to the day before the day of three weeks before. Then, a user who goes to Hokkaido to experience the snow festival has a high probability of browsing a web page about Hokkaido during the period from January 3 to January 19. On January 5, a user U6 who lives in Kanto has browsed a web page about Hokkaido. Therefore, the user U6 is likely to go to Hokkaido during the period of the snow festival. Therefore, the advertisement distribution unit 116 may distribute advertisement information on the snow festival in Hokkaido to the user U6. For example, the advertisement distribution unit 116 may publish the advertisement information on a web page about Hokkaido to be browsed by the user. If the user U6 browses the web page before January 3 or after January 19, the advertisement distribution unit 116 is not required to distribute the advertisement information to the user U6.

When the behavior tendency information indicates a tendency of a series of operation behaviors that are likely to be taken, the advertisement distribution unit 116 compares the series of operation behaviors with one or more operation behaviors taken by the distribution destination user. Then, when the one or more operation behaviors taken by the distribution destination user correspond to one or more operation behaviors from a first operation behavior to an operation behavior at any stage in a series of operation behaviors indicated by the behavior tendency information, the advertisement distribution unit 116 may distribute the advertisement information associated with the behavior tendency information to the user terminal 8 or 9 of the distribution destination user. That is, the advertisement distribution unit 116 may distribute the advertisement information to: a user who has taken operation behaviors same as or similar to the entire series of operation behaviors that the user going to the advertisement target place tends to take; a user who has taken an operation behavior same as or similar to the first operation behavior in the series of operation behaviors; or a user who has taken operation behaviors same as or similar to the operation behavior from the first to an operation behavior at a middle stage. By determining at which stage the advertisement information is to be distributed, the advertisement information can be distributed at an appropriate timing. When the behavior tendency information includes a tendency of a time interval between operation behaviors in a series of operation behaviors, the fact that the operation behavior information corresponds to the behavior tendency information means that a time interval between operation behaviors taken by the distribution destination user further corresponds to a time interval between operation behaviors in the series of operation behaviors indicated by the behavior tendency information. The time interval corresponding may indicate that, for example, a ratio of a time interval between operation behaviors taken by the distribution destination user to a time interval between operation behaviors in the series of operation behaviors indicated by the behavior tendency information is within a predetermined range with 1 as a reference (for example, a range of 0.8 to 1.2, and the like). That is, the advertisement distribution unit 116 distributes advertisement information to a user who has taken at least one operation behavior that is the same as or similar to at least one operation behavior from the first to any stages of the series of operation behaviors indicated by the behavior tendency information, in the same order and at similar time intervals. Similarly to above, the advertisement distribution unit 116 may distribute the advertisement information only when an attribute of the distribution destination user is the same as or similar to the attribute indicated by the attribute information associated with the behavior tendency information.

FIG. 14 is a view showing an example of a series of operation behaviors that at least one user tends to take and a timing of distribution of advertisement information. As in the example shown in FIG. 7, users traveling to Hokkaido tend to take operation behaviors of stages S1 to S4. The advertisement distribution unit 116 may distribute the advertisement information about Hokkaido to a user who has taken the operation behavior of the stage S1 alone, a user who has taken the operation behaviors of the stages S1 and S2 in that order, a user who has taken the operation behaviors of the stages S1 to S3 in that order, or a user who has taken the operation behaviors of the stages S1 to S4 in that order.

A user who has taken the operation behaviors of more stages in the series of operation behaviors has more probability of going to the advertisement target place, and therefore has a higher conversion rate. Whereas, among users who have merely taken operation behaviors of a small number of stages, there are many users who have not determined whether or not to go to the advertisement target place or where to go. That is, there are many potential users who may go to the advertisement target place. Accordingly, among the potential users, the number of users going to the advertisement place by distribution of the advertisement information may change depending on the timing of the distribution of the advertisement information. For example, in FIG. 14, at a stage of searching for information regarding sightseeing (step S1), the conversion rate is low since there are many prefectures as travel destination candidates, but there are many users who may go to Hokkaido since many users have not determined a travel destination. At a stage of booking a hotel in Hokkaido (step S4), the conversion rate is high since a considerable number of users go to Hokkaido, but the effect of distributing the advertisement information is relatively low since many users have already determined to go to Hokkaido. Therefore, for the operation behavior at each stage included in the series of operation behaviors indicated by the behavior tendency information, the advertisement distribution unit 116 may determine the priority of the distribution of the advertisement information to a user who has taken one or more operation behaviors from the first operation behavior to the operation behavior at that stage in the series of operation behaviors. That is, in the series of operation behaviors, the advertisement distribution unit 116 determines a stage where the advertisement information is preferentially distributed. Then, in the series of operation behaviors indicated by the behavior tendency information, the advertisement distribution unit 116 may control the distribution of the advertisement information on the basis of the priority determined for one or more operation behaviors corresponding to the one or more operation behaviors taken by the distribution destination user.

For example, the advertisement distribution unit 116 may calculate a visitor increase rate or a profit rate due to the distribution of the advertisement information for the operation behavior at each stage in the series of operation behaviors indicated by the behavior tendency information. The advertisement distribution unit 116 may determine the priority on the basis of the visitor increase rate or the profit rate. Specifically, the advertisement distribution unit 116 sets a higher priority as the visitor increase rate or the profit rate is higher. Using the visitor increase rate makes it possible to efficiently increase the number of users who go to the advertisement target place. In addition, using the profit rate makes it possible to increase the number of users who go to the advertisement target place so that the profit of the advertiser at the advertisement target place increases efficiently. The visitor increase rate can be calculated based on a conversion rate and a non-advertisement visitor rate. The conversion rate for the operation behavior at each stage can be calculated based on the operation behavior history such as the search history DB61 and the browse history DB62, the location information DB41, and the advertisement distribution history DB102. The non-advertisement visitor rate can be calculated based on an operation behavior history and the location information DB 41. The profit rate can be calculated based on advertising expenses, a unit price per customer, a visitor increase rate, and the like. The advertisement distribution unit 116 may calculate, for example, a visitor increase rate or a profit rate periodically for each advertisement place, and may store this visitor increase rate or profit rate in the advertisement DB 101 in advance as priority information. When distribution of advertisement information for a certain advertisement target place is started, the visitor increase rate and the profit rate for the advertisement target place are unknown. In this case, the advertisement distribution unit 116 may use a visitor increase rate or a profit rate calculated for a place, for example, that is in the same category as the category of the advertisement target place, and that has the same or similar behavior tendency information associated with the advertisement target place. Alternatively, the advertisement distribution unit 116 may set a predetermined priority for each operation behavior indicated by the behavior tendency information associated with the advertisement target place. After that, the advertisement distribution unit 116 may calculate a visitor increase rate or a profit rate after the advertisement distribution history and the terminal location information for the advertisement target place are accumulated.

When two or more advertisement target places that are candidates for distributing advertisement information to the distribution destination user are identified, the advertisement distribution unit 116 may compare, for example, the visitor increase rate or the profit rate between the advertisement target places, and may give a higher priority to the advertisement information distribution as the advertisement target place has a higher visitor increase rate or profit rate. Alternatively, for each advertisement target place, the advertisement distribution unit 116 may determine an advertisement fee, a bid amount, or the like for the current distribution of the advertisement information, on the basis of information such as an upper limit of an advertisement fee in a predetermined period (for example, one day), an advertisement fee actually spent in the predetermined period, and a frequency of distribution of the advertisement information, and the visitor increase rate or the profit rate. The advertisement distribution unit 116 sets a higher advertisement fee or bid amount as the visitor increase rate or the profit rate is higher. Then, the advertisement distribution unit 116 may set a higher priority to the distribution of the advertisement information for the advertisement target place whose determined advertisement fee or bid amount is higher.

For example, as shown in FIG. 14, suppose that the visitor increase rate becomes highest by distributing advertisement information at the stage S2 among the stages S1 to S4, for advertisement information related to Hokkaido. Therefore, the advertisement distribution unit 116 provides the stage S2 with the highest priority of the distribution of the advertisement information related to Hokkaido. That is, the probability of distributing the advertisement information related to Hokkaido to a user who has performed the operation behavior of the stage S2 is relatively high. Whereas, the probability of distributing the advertisement information related to Hokkaido to a user who has performed the operation behavior of the stage S1, S3, or S4 will be relatively low in accordance with their priorities. Further, for example, a user who goes to a certain facility in Sapporo tends to book a hotel in Sapporo before going to that facility. In addition, a visitor increase rate to the facility due to distribution of the advertisement information to a user who has booked a hotel in Sapporo is high. Suppose that the distribution destination user has booked a hotel in Sapporo in the stage S4 shown in FIG. 14. Here, the priority of distribution of advertisement information related to the facility is higher than distribution of advertisement information related to Hokkaido. Therefore, the advertisement distribution unit 116 distributes the advertisement information related to the facility.

[2-3. Operation of Advertisement Distribution Server]

Next, an operation of the advertisement distribution server 10 will be described with reference to FIG. 15. FIG. 15 is a flowchart showing an example of an advertisement distribution process by the system controller 11 of the advertisement distribution server 10. For example, the user terminal 8 or 9 transmits a web page request to the web server 6 or transmits a web page search request to the operation behavior history management server 7, on the basis of an operation of the distribution destination user. Each time the advertisement distribution server 10 receives a web page request or a search request from the web server 6 or the operation behavior history management server 7, the system controller 11 executes the advertisement distribution process.

As shown in FIG. 15, the advertisement distribution destination behavior information acquisition unit 114 acquires operation behavior information of the distribution destination user (step S21). For example, the advertisement distribution destination behavior information acquisition unit 114 acquires a URL of the requested web page as the operation behavior information from the request received from the web server 6. Further, for example, the advertisement distribution destination behavior information acquisition unit 114 acquires a keyword as operation behavior information from the search request received from the operation behavior history management server 7. Further, the advertisement distribution destination behavior information acquisition unit 114 acquires a search history or a browse history of the distribution destination user from the operation behavior history management server 7, as a history of the operation behavior information. Next, when the terminal device currently used by the distribution destination user is the user terminal 8, the advertisement distribution destination behavior information acquisition unit 114 acquires current terminal location information from the user terminal 8 (step S22).

Next, the advertisement distribution destination behavior information acquisition unit 114 acquires an attribute of the distribution destination user from the user information management server 3 (step S23). The advertisement distribution destination behavior information acquisition unit 114 identifies, from the advertisement DB 101, at least one advertisement target place in which a place ID is associated with attribute information indicating an attribute same as or similar to the attribute of the distribution destination user (step S24).

Next, the behavior tendency information acquisition unit 115 acquires, from the advertisement DB 101, the operation behavior tendency information associated with the identified advertisement target place. The advertisement distribution unit 116 extracts, among the at least one identified advertisement target places, at least one advertisement target place in which the operation behavior information of the distribution destination user corresponds to the operation behavior tendency information, as at least one distribution target candidate of the advertisement information (step S25). For the advertisement target place in which the operation behavior tendency information indicates one operation behavior, the advertisement distribution unit 116 determines, as a distribution target candidate of the advertisement information, an advertisement target place in which, for example, the operation behavior tendency indicated by the operation behavior tendency information is the same as or similar to an operation behavior currently taken by the distribution destination user. For the advertisement target place in which the operation behavior tendency information indicates a series of operation behaviors, the advertisement distribution unit 116 determines whether or not, for example, an operation behavior at any stage in the series of operation behaviors indicated by the operation behavior tendency information is the same as or similar to the operation behavior currently taken by the distribution destination user. Suppose that the operation behavior currently taken by the distribution destination user is the same as or similar to the Nth operation behavior in the series of operation behaviors indicated by the operation behavior tendency information. When N=1 is satisfied, the advertisement distribution unit 116 determines the corresponding advertisement target place as a distribution candidate of the advertisement information. When N>2 is satisfied, based on the history of the operation behavior information of the distribution destination user, the advertisement distribution unit 116 determines, as a distribution candidate of the advertisement information, an advertisement target place where operation behaviors same as or similar to the first to Nth operation behaviors among the series of operation behaviors indicated by the operation behavior tendency information are performed in that order by the distribution destination user. Here, the advertisement distribution unit 116 may compare a tendency of a time interval between operation behaviors in the first to Nth operation behaviors indicated by the operation behavior tendency information, with a time interval between operation behaviors taken by the distribution destination user. The advertisement distribution unit 116 may determine the corresponding advertisement target place as a distribution candidate of the advertisement information, only when a ratio of the tendency of the time interval to the time interval between operation behaviors taken by the distribution destination user is within a predetermined range.

Next, the advertisement distribution unit 116 determines the priority of the distribution of the advertisement information for each of the advertisement target places determined as the distribution candidates of the advertisement information (step S26). When the terminal device currently used by the distribution destination user is the user terminal 8, the advertisement distribution unit 116 may acquire, for example, from the advertisement DB 101, designated location information associated with each advertisement target place that is a distribution candidate of advertisement information, and calculate a distance from the user terminal 8 to each advertisement target place, on the basis of the designated location information and the terminal location information. The advertisement distribution unit 116 sets a higher priority as an advertisement target place has a shorter distance from the user terminal 8. Further, for example, the advertisement distribution unit 116 may acquire, from the advertisement DB 101, priority information such as a conversion rate, a visitor increase rate, or a profit rate of each advertisement target place that is a distribution candidate of advertisement information, and determine an advertisement fee or a bid amount for the current distribution of the advertisement information on the basis of the priority information. The advertisement distribution unit 116 sets a higher priority as the determined advertisement fee or bid price is higher.

Next, the advertisement distribution unit 116 distributes the advertisement information preferentially for the advertisement target place in which the determined priority is relatively high, to the user terminal 8 or 9 used by the distribution destination user (step S27). For example, the advertisement distribution unit 116 may distribute advertisement information related to an advertisement target place having the highest priority. Further, for example, when there is a plurality of advertisement spaces on a web page displayed by the user terminal 8 or 9, the advertisement distribution unit 116 selects advertisement target places of the number corresponding to the number of advertisement spaces, in a descending order of priority. The advertisement distribution unit 116 distributes advertisement information related to the selected advertisement target place. At this time, the advertisement distribution unit 116 may distribute the advertisement information such that the advertisement information is displayed in an advertisement space at a position more easily viewable by the distribution destination user, as the advertisement target place has a higher priority. When the advertisement information is distributed, the advertisement distribution unit 116 ends the advertisement distribution process.

As described above, according to the present embodiment, the advertisement distribution server 10 acquires operation information indicating an operation behavior taken through at least one terminal operation on the user terminal 8 or 9 by the distribution destination user. In addition, the advertisement distribution server 10 acquires the behavior tendency information from the advertisement DB 101 that stores the behavior tendency information and the advertisement information regarding the advertisement target place in association with each other. Further, when the acquired operation information corresponds to the behavior tendency information, the advertisement distribution server 10 distributes the advertisement information associated with the behavior tendency information to the user terminal 8 or 9. Therefore, when the distribution destination user takes at least one operation behavior same as or similar to the at least one operation behavior indicated by the behavior tendency information, the advertisement information related to the place is distributed. Therefore, it is possible to increase the number of users who visit the advertisement target place.

Further, the advertisement distribution server 10 may acquire operation information and terminal location information regarding the location of the user terminal 8. In addition, when the advertisement DB 101 stores behavior tendency information corresponding to the operation information for two or more places among the plurality of places, the advertisement distribution server 10 may acquire a distance from a location indicated by the terminal location information to a location indicated by the designated location information for each of the two or more places. In addition, the advertisement distribution server 10 may determine which place of two or more places is to be prioritized for the distribution of the advertisement information on the basis of the acquired distance. Consequently, when there are two or more places that are likely to be visited by other users showing an operation behavior same as or similar to the operation behavior taken by the distribution destination user, it is determined the distribution of the advertisement information related to which place is to be prioritized, on the basis of a distance from a location of the distribution destination user to each place. In this case, it is possible to prioritize the distribution of the advertisement information related to a place that is easily accessible to the distribution destination user. Therefore, the advertisement information can be distributed so as to efficiently increase the number of users who visit the advertisement target place.

In addition, when the advertisement DB 101 stores the behavior tendency information corresponding to the operation information for two or more places among the plurality of places, the advertisement distribution server 10 may acquire a percentage of the users whose terminal location information of the user terminal 8 being substantially the same as the designated location information after the distribution of the advertisement information for each of the two or more places, among the users for whom advertisement information has been distributed on the user terminal 8. In addition, the advertisement distribution server 10 may determine which place of two or more places is to be prioritized for the distribution of the advertisement information on the basis of the acquired percentage.

Consequently, when there are two or more places that are likely to be visited by other users showing an operation behavior same as or similar to the operation behavior taken by the distribution destination user, it is determined the distribution of the advertisement information related to which place is to be prioritized, on the basis of a percentage of users who have been to the designated place among users who have received the distribution of the advertisement information. In this case, it is possible to prioritize the distribution of the advertisement information related to a place where the distribution destination user has high probability of going by viewing the advertisement information. Therefore, the advertisement information can be distributed so as to efficiently increase the number of users who visit the advertisement target place.

Further, the advertisement distribution server 10 may acquire operation information indicating a plurality of operation behaviors taken by the distribution destination user. In addition, when one or more operation behaviors among the plurality of operation behaviors indicated by the operation information correspond to one or more operation behaviors from a first operation behavior to an operation behavior at any stage in the series of operation behaviors indicated by the behavior tendency information, the advertisement distribution server 10 may distribute the advertisement information. In this case, when the distribution destination user takes one or more operation behaviors that are the same as or similar to the operation behaviors from the first operation behavior to an operation behavior of any stage in the series of operation behaviors indicated by the behavior tendency information, advertisement information related to the place is distributed. Therefore, it is possible to increase the number of users who visit the place.

In addition, when two or more operation behaviors among the plurality of operation behaviors indicated by the operation information correspond to two or more operation behaviors from a first operation behavior to an operation behavior at any stage in the series of operation behaviors indicated by the behavior tendency information, and that a time interval between operation behaviors in two or more operation behaviors indicated by the operation information corresponds to a tendency of a time interval between operation behaviors in two or more operation behaviors indicated by the behavior tendency information, the advertisement distribution server 10 may distribute the advertisement information. In this case, in a case where the distribution destination user has taken operation behaviors same as or similar to two or more operation behaviors in the series of operation behaviors indicated by the behavior tendency information, when a time interval between the operation behaviors taken by the distribution destination user is the same as or relatively close to a time interval indicated by the behavior tendency information, the advertisement information is distributed. Therefore, it is possible to increase the number of users who visit the place.

In addition, for the operation behavior at each stage included in the series of operation behaviors indicated by the behavior tendency information, the advertisement distribution server 10 may determine the priority of the distribution of the advertisement information to the user who has taken one or more operation behaviors from the first operation behavior to the operation behavior at that stage. In addition, in the series of operation behaviors indicated by the behavior tendency information, the advertisement distribution server 10 may control the distribution of the advertisement information on the basis of the priority determined for one or more operation behaviors corresponding to the one or more operation behaviors indicated by the operation information. In this case, among the series of operation behaviors indicated by the behavior tendency information, it is determined the advertisement information is to be preferentially distributed to a user who has taken operation behaviors that are the same as or similar to operation behaviors until which stage from the first operation behavior. Therefore, the advertisement information can be distributed so as to efficiently increase the number of users who visit the advertisement target place.

The priority may be based on a visitor increase rate due to the distribution of the advertisement information. In this case, the number of users who visit the advertisement target place can be efficiently increased with respect to the number of times or a frequency of distribution of the advertisement information.

Further, the priority may be based on a profit rate due to distribution of the advertisement information. In this case, it is possible to increase the number of users who visit the advertisement target place so that the profit at the advertisement target place is efficiently increased with respect to the advertisement cost.

Further, the advertisement information stored in the advertisement DB 101 may be related to an event that is held at a predetermined time at the advertisement target place. Further, the advertisement distribution server 10 may identify a plurality of users who have been to the advertisement target place after taking an operation behavior indicated by the behavior tendency information stored in the advertisement DB 101, on the basis of a history of the terminal location information and a history of the operation behavior, and acquire an elapsed time from when the operation behavior indicated by the behavior tendency information is taken to when the user goes to the advertisement target place for each of the identified users. Further, the advertisement distribution server 10 may identify change information indicating a change of the number of taking the at least one operation behavior indicated by the behavior tendency information according to the elapsed time, on the basis of the acquired elapsed time. Further, the advertisement distribution server 10 may identify an elapsed time in which the number of taking the at least one operation behavior indicated by the behavior tendency information is relatively large, on the basis of the identified change information. Further, in accordance with determination that the acquired operation information corresponds to the behavior tendency information, and that the operation behavior indicated by the operation information has been taken before the identified elapsed time from the predetermined time, the advertisement distribution server 10 may distribute the advertisement information to the user terminal 8 or 9. In this case, it is possible to increase the probability that the user will go to the advertisement target place to experience the event.

In addition, the storage unit 14 may store an advertisement distribution history indicating a user who has received advertisement information on the user terminal 8 or 9 among a plurality of users. Further, on the basis of the history of the terminal location information, the history of the operation behavior, and the advertisement distribution history, the advertisement distribution server 10 may acquire: a conversion rate indicating a percentage of users who have been to the advertisement target place among users who have taken a corresponding operation behavior corresponding to the operation behavior indicated by the behavior tendency information stored in the advertisement DB 101, and who have received the advertisement information on the user terminal 8 or 9; and a non-advertisement visitor rate indicating a percentage of users who have been to the advertisement target place among users who have taken the corresponding operation behavior, and who have not received the advertisement information on the user terminal 8 or the user terminal 9. Further, the advertisement distribution server 10 may acquire an increase rate of users who go to the advertisement target place due to the distribution of the advertisement information, on the basis of the acquired conversion rate and non-advertisement visitor rate. Further, the advertisement distribution server 10 may control the distribution of the advertisement information on the basis of the acquired increase rate. In this case, the number of users who go to the advertisement target place can be efficiently increased by controlling the distribution of the advertisement information based on the visitor increase rate.

The invention claimed is:

1. A behavioral analysis and content distribution device comprising:
   at least one memory having computer program code stored thereon; and
   at least one processor configured to read the computer program code from the at least one memory and operate as instructed by the computer program code, the computer program code comprising:
   code configured to cause the at least one processor to provide an add-on for execution on web browsers installed on user terminals and configured to collect operation behavior information taken through a terminal upon which it is executed;
   code configured to cause the at least one processor to receive operation behavior information sent from user terminals and via execution of the add-on executing on the user terminals and to store the received operation behavior information in storage;
   designated location information acquisition code configured to cause the at least one processor to acquire designated location information regarding a location of a place that has been designated in advance;
   behavior history acquisition code configured to cause the at least one processor to acquire from the storage, for each of a plurality of users, a history of terminal location information regarding a location of a terminal of a respective user, identification information of the respective user associated with the terminal location information, and a history of operation information indicating an operation behavior taken through at least one terminal operation by the respective user having the identification information;
   output code configured to cause the at least one processor to identify identification information associated with terminal location information, which has been identified as being substantially the same as the designated location information, and output tendency information indicating at least one operation behavior that tends to be taken by at least one user having the identified identification information and taken before a time when a terminal of the at least one user is located at a location indicated by the terminal location information, which has been identified as being substantially the same as the designated location information, for distribution of information regarding the designated place, wherein the at least one operation behavior comprises viewing a web page and the tendency information indicates what web page the at least one user tends to view;
   storage code configured to cause the at least one processor to store, in a content information storage, the tendency information in association with content information related to the designated place;
   second behavior information acquisition code configured to cause the at least one processor to receive, as second operation information indicating at least one operation behavior comprising viewing a particular web page taken through at least one terminal operation by a second user on a second terminal, a first request for the particular web page including a plurality of display spaces from the second terminal; and
   distribution code configured to cause the at least one processor to output, on the particular web page displayed on the second terminal, the content information related to the designated place to the second terminal, based on a determination that the received second operation information corresponds to the tendency information, which is stored in the content information storage in association with the content information related to the designated place, wherein the content information storage stores, for each of a plurality of places that have been designated in advance, the designated location information regarding a location of a respective place, the tendency information indicating the at least one operation behavior that tend to be taken before a time when a terminal of the at least one user is at a location indicated by the terminal location information identified as being substantially the same as the designated location information on the respective place, and content information related to an event that is held at an event time at the respective place, wherein the computer program code further comprises:

elapsed time acquisition code configured to cause the at least one processor to:

in response to a determination that the received first request as the second operation information corresponds to the tendency information for two or more places among the plurality of places, identify for each of the two or more places, a plurality of third users who have been to a respective place after taking the at least one operation behavior indicated by the tendency information based on histories of the terminal location information and the histories of the operation information stored in the storage, and acquire, for each of the two or more places, an elapsed time from when the at least one operation behavior indicated by the tendency information is taken to when each of the plurality of identified third users goes to a respective place, elapsed time identification code configured to cause the at least one processor to identify, for each of the two or more places, the elapsed time acquired for either a largest number of users or a higher rate of a number of users than a predetermined rate among the plurality of third users, and priority determination code configured to cause the at least one processor to determine, for each of the two or more respective places, a priority based on whether a difference between a time when the first request as the second operation information is received and the event time of the event to be held at the respective place corresponds to the elapsed time identified for the respective place, wherein the distribution code is configured to cause the at least one processor to arrange the content information for the two or more places in order of determined priorities and output the arranged content information in the plurality of display spaces of the particular web page, and wherein, in response to receiving a second request for the particular web page as the second operation information from the second terminal after outputting the content information for the two or more places, the distribution code is further configured to cause the at least one processor to rearrange the content information for the two or more places in the plurality of display spaces of the particular web page according to a change of the priority caused by a change of the difference between the request receiving time and the event time of the event.

2. The behavioral analysis and content distribution device according to claim 1, wherein the output code is configured to cause the at least one processor to output the tendency information and attribute information indicating an attribute of at least one user who has taken at least one operation behavior indicated by the tendency information, among users having the identification information associated with the terminal location information, which has been identified as being substantially the same as the designated location information.

3. The behavioral analysis and content distribution device according to claim 2, wherein the computer program code further comprises determination code configured to cause the at least one processor to determine, based on the operation information, the attribute of at least one user who has taken at least one operation behavior indicated by the tendency information, and the output code is configured to cause the at least one processor to output the attribute information indicating the determined attribute.

4. The behavioral analysis and content distribution device according to claim 1, wherein the output code is configured to cause the at least one processor to output the tendency information indicating: the tendency of at least one operation behavior; and a tendency of the elapsed time from when the at least one operation behavior is taken to when the terminal is located at the location indicated by the terminal location information, which has been identified as being substantially the same as the designated location information.

5. The behavioral analysis and content distribution device according to claim 1, wherein the output code is configured to cause the at least one processor to output tendency information indicating the tendency of at least one operation behavior and a tendency of a time interval between operation behaviors included in the at least one operation behavior.

6. The behavioral analysis and content distribution device according to claim 1, wherein the distribution code is further configured to acquire:

a non-advertisement visitor rate comprising a percentage of users who have been to the designated place among users who have taken a corresponding operation behavior included in the at least one operation behavior, and who have not received the content information on the second terminal, and wherein the priority determination code is further configured to determine the priority of distribution of the content information to the second user based on the non-advertisement visitor rate.

7. The behavioral analysis and content distribution device according to claim 6, wherein the distribution code is further configured to acquire:

a conversion rate indicating a percentage of users who have been to the designated place among users who have taken the corresponding operation behavior corresponding to behavior tendency information, stored in the content information storage, and who have received the content information on the second terminal; and an increase rate indicating users who go to the designated place due to the distribution of the content information, based on the conversion rate and the non-advertisement visitor rate, and wherein the priority determination code is further configured to determine the priority of distribution of the content information to the second user based on an acquired increase rate.

8. The behavioral analysis and content distribution device according to claim 1, wherein
an advertisement information storage stores the tendency information indicating a series of operation behaviors that tend to be taken,
the second behavior information acquisition code is configured to cause the at least one processor to acquire the second operation information indicating a plurality of operation behaviors taken by the second user, and
the distribution code is configured to cause the at least one processor to distribute advertisement information in response to determining that one or more operation behaviors among the plurality of operation behaviors indicated by the second operation information correspond to one or more operation behaviors from a first operation behavior to an operation behavior at any stage in the series of operation behaviors indicated by the tendency information.

9. A behavioral analysis and content distribution method performed by at least one computer, the method comprising:
providing an add-on for execution on web browsers installed on user terminals and configured to collect operation behavior information taken through a terminal upon which it is executed;
receiving operation behavior information sent from user terminals and via execution of the add-on executing on the user terminals;
storing the received operation behavior information in storage;
acquiring designated location information regarding a location of a place that has been designated in advance;
acquiring from the storage, for each of a plurality of users, a history of terminal location information regarding a location of a terminal of a respective user, identification information of the respective user associated with the terminal location information, and a history of operation information indicating an operation behavior taken through at least one terminal operation by the respective user having the identification information;
identifying identification information associated with terminal location information, which has been identified as being substantially the same as the designated location information, and output tendency information indicating at least one operation behavior that tends to be taken by at least one user having the identified identification information and taken before a time when a terminal of the at least one user is located at a location indicated by the terminal location information, which has been identified as being substantially the same as the designated location information, for distribution of information regarding the designated place, wherein the at least one operation behavior comprises viewing a web page and the tendency information indicates what web page the at least one user tends to view;
storing, in a content information storage, the tendency information in association with content information related to the designated place;
receiving, as second operation information indicating at least one operation behavior comprising viewing a particular web page taken through at least one terminal operation by a second user on a second terminal, a first request for the particular web page including a plurality of display spaces from the second terminal; and
outputting, on the particular web page displayed on the second terminal, the content information related to the designated place to the second terminal, based on a determination that the received second operation information corresponds to the tendency information, which is stored in the content information storage in association with the content information related to the designated place,
wherein the content information storage stores, for each of a plurality of places that have been designated in advance, the designated location information regarding a location of a respective place, the tendency information indicating the at least one operation behavior that tend to be taken before a time when a terminal of the at least one user is at a location indicated by the terminal location information identified as being substantially the same as the designated location information on the respective place, and content information related to an event that is held at an event time at the respective place,
in response to a determination that the received first request as the second operation information corresponds to the tendency information for two or more places among the plurality of places, identify for each of the two or more places, a plurality of third users who have been to a respective place after taking the at least one operation behavior indicated by the tendency information based on histories of the terminal location information and the histories of the operation information stored in the storage,
acquiring, for each of the two or more places, an elapsed time from when the at least one operation behavior indicated by the tendency information is taken to when each of the plurality of identified third users goes to a respective place,
identifying, for each of the two or more places, the elapsed time acquired for either a largest number of users or a higher rate of a number of users than a predetermined rate among the plurality of third users, and
determining, for each of the two or more respective places, a priority based on whether a difference between a time when the first request as the second operation information is received and the event time of the event to be held at the respective place corresponds to the elapsed time identified for the respective place,
arranging the content information for the two or more places in order of determined priorities and output the arranged content information in the plurality of display spaces of the particular web page, and
in response to receiving a second request for the particular web page as the second operation information from the second terminal after outputting the content information for the two or more places, rearranging the content information for the two or more places in the plurality of display spaces of the particular web page according to a change of the priority caused by a change of the difference between the request receiving time and the event time of the event.

10. A non-transitory computer readable medium storing thereon a computer program, the computer program, when executed by at least one processor, causing the at least one processor to:
provide an add-on for execution on web browsers installed on user terminals and configured to collect operation behavior information taken through a terminal upon which it is executed;
receive operation behavior information sent from user terminals and via execution of the add-on executing on the user terminals;

store the received operation behavior information in storage;

acquire designated location information regarding a location of a place that has been designated in advance;

acquire from the storage, for each of a plurality of users, a history of terminal location information regarding a location of a terminal of a respective user, identification information of the respective user associated with the terminal location information, and a history of operation information indicating an operation behavior taken through at least one terminal operation by the respective user having the identification information;

identify identification information associated with terminal location information, which has been identified as being substantially the same as the designated location information, and output tendency information indicating at least one operation behavior that tends to be taken by at least one user having the identified identification information and taken before a time when a terminal of the at least one user is located at a location indicated by the terminal location information, which has been identified as being substantially the same as the designated location information, for distribution of information regarding the designated place, wherein the at least one operation behavior comprises viewing a web page and the tendency information indicates what web page the at least one user tends to view;

store, in a content information storage, the tendency information in association with content information related to the designated place;

receive, as second operation information indicating at least one operation behavior comprising viewing a particular web page taken through at least one terminal operation by a second user on a second terminal, a first request for the particular web page including a plurality of display spaces from the second terminal; and output, on the particular web page displayed on the second terminal, the content information related to the designated place to the second terminal, based on a determination that the received second operation information corresponds to the tendency information, which is stored in the content information storage in association with the content information related to the designated place, wherein the content information storage stores, for each of a plurality of places that have been designated in advance, the designated location information regarding a location of a respective place, the tendency information indicating the at least one operation behavior that tend to be taken before a time when a terminal of the at least one user is at a location indicated by the terminal location information identified as being substantially the same as the designated location information on the respective place, and content information related to an event that is held at an event time at the respective place, in response to a determination that the received first request as the second operation information corresponds to the tendency information for two or more places among the plurality of places, identify for each of the two or more places, a plurality of third users who have been to a respective place after taking the at least one operation behavior indicated by the tendency information based on histories of the terminal location information and the histories of the operation information stored in the storage, acquire, for each of the two or more places, an elapsed time from when the at least one operation behavior indicated by the tendency information is taken to when each of the plurality of identified third users goes to a respective place, identify, for each of the two or more places, the elapsed time acquired for either a largest number of users or a higher rate of a number of users than a predetermined rate among the plurality of third users, and determine, for each of the two or more respective places, a priority based on whether a difference between a time when the first request as the second operation information is received and the event time of the event to be held at the respective place corresponds to the elapsed time identified for the respective place, arrange the content information for the two or more places in order of determined priorities and output the arranged content information in the plurality of display spaces of the particular web page, and in response to receiving a second request for the particular web page as the second operation information from the second terminal after outputting the content information for the two or more places, rearrange the content information for the two or more places in the plurality of display spaces of the particular web page according to a change of the priority caused by a change of the difference between the request receiving time and the event time of the event.

\* \* \* \* \*